(12) United States Patent
Isshiki et al.

(10) Patent No.: US 12,200,147 B2
(45) Date of Patent: *Jan. 14, 2025

(54) COLLATION SYSTEM, CLIENT, AND SERVER

(71) Applicant: NEC Corporation, Tokyo (JP)

(72) Inventors: Toshiyuki Isshiki, Tokyo (JP); Toshihiko Okamura, Tokyo (JP); Haruna Fukuda, Tokyo (JP); Hiroto Tamiya, Tokyo (JP); Masahiro Nara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 451 days.

This patent is subject to a terminal disclaimer.

(21) Appl. No.: 17/615,921

(22) PCT Filed: Jun. 5, 2019

(86) PCT No.: PCT/JP2019/022322
§ 371 (c)(1),
(2) Date: Dec. 2, 2021

(87) PCT Pub. No.: WO2020/245939
PCT Pub. Date: Dec. 10, 2020

(65) Prior Publication Data
US 2022/0321363 A1 Oct. 6, 2022

(51) Int. Cl.
*H04L 9/32* (2006.01)
*H04L 9/08* (2006.01)

(52) U.S. Cl.
CPC .......... *H04L 9/3271* (2013.01); *H04L 9/0869* (2013.01)

(58) Field of Classification Search
CPC ... H04L 9/3271; H04L 9/0869; H04L 9/0825; H04L 9/0894; H04L 9/3231; G06F 21/32; G06F 21/60
See application file for complete search history.

(56) References Cited

U.S. PATENT DOCUMENTS

2009/0006855 A1* 1/2009 Tuyls .................... H04L 9/3218
  713/182
2014/0334622 A1* 11/2014 Smyth .................... H04L 9/008
  713/168

(Continued)

FOREIGN PATENT DOCUMENTS

| JP | 2008-521025 | | 6/2008 |
| JP | 2009-129292 | A | 6/2009 |
| JP | 2011-211593 | A | 10/2011 |

(Continued)

OTHER PUBLICATIONS

Elaine Barke, "Recommendation for Digital Signature Timeliness", NIST Special Publication 800-102, 2009, 30 pages (Year: 2009).*

(Continued)

*Primary Examiner* — Han Yang

(57) ABSTRACT

The client includes a random number generation unit which generates a random number, a concealed information storage unit which stores concealed information generated by concealing registered information and the generated random number using a secret key, and a response computation unit which, on the basis of a challenge transmitted from the server, the collation information input for collation with the registered information, and the concealed information, computes a response corresponding to the challenge and including a concealed index, generated by concealing an index indicating closeness between the registered information and the collation information. The server includes a challenge generation unit which generates the challenge using a public key corresponding to the secret key, and a determination unit which uses the public key and the random number transmitted from the client to determine whether or not the response transmitted from the client corresponds to the challenge.

19 Claims, 9 Drawing Sheets

(56) References Cited

U.S. PATENT DOCUMENTS

| | | | | |
|---|---|---|---|---|
| 2015/0012742 A1* | 1/2015 | Gorelik | ............... | H04L 63/0861 |
| | | | | 713/155 |
| 2019/0394039 A1* | 12/2019 | Higo | ...................... | H04L 9/3236 |
| 2022/0029829 A1* | 1/2022 | Fukuda | ................. | H04L 9/3263 |
| 2022/0045852 A1* | 2/2022 | Isshiki | ................... | H04L 9/3247 |
| 2022/0052841 A1* | 2/2022 | Fukuda | ................. | H04L 9/3231 |

FOREIGN PATENT DOCUMENTS

| | | |
|---|---|---|
| JP | 2014-220661 A | 11/2014 |
| WO | 2018/110608 A1 | 6/2018 |

OTHER PUBLICATIONS

Higo, "Security Requirements for Store-on-Client and Verify-on-Server Secure Biometric Authentication", https://doi.org/10.1007/978-3-030-39749-4_6, Emerging Technologies for Authorization and Authentication (ETAA 2019), 18 pages (Year: 2019).*

International Search Report for PCT Application No. PCT/JP2019/022322, mailed on Sep. 3, 2019.

English translation of Written opinion for PCT Application No. PCT/JP2019/022322, mailed on Sep. 3, 2019.

Hiroto Tamiya et al., "An online secure biometric authentication method in which the client holds a template", Preprints of 2020 Symposium on Cryptography and Information Security (SCIS 2019), Jan. 15, 2019, pp. 1-7.

* cited by examiner

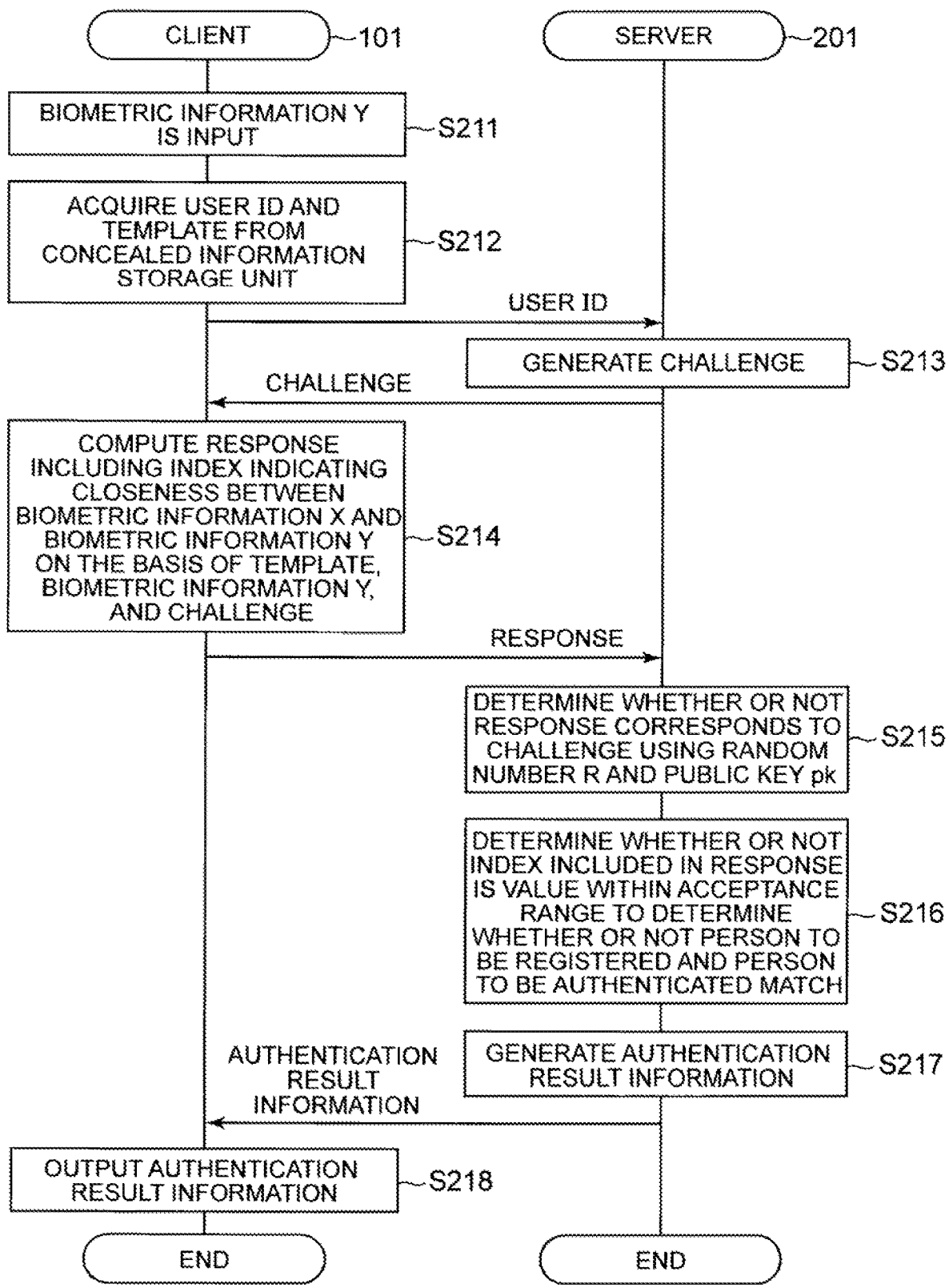

FIG. 6

| CLIENT 101 | | SERVER 201 |
|---|---|---|
| INPUT : $(x_1, x_2, \ldots, x_n)$ REGISTERED BIOMETRIC INFORMATION | | |
| $(r_1, r_2, \ldots, r_n) \leftarrow^R \mathbb{Z}_q$ $R_1, R_2 \leftarrow^R \mathbb{Z}_q$ | | |
| TEMPLATE : $\begin{cases} \{R_1 x_i + R_2 r_i\} \\ \{g^{r_i}\} \end{cases}$ | | |
| $g^{R_1}, R_2$ | $\rightarrow$ | |
| store(TEMPLATE) | | store($g^{R_1}, R_2$) |

FIG. 7

| CLIENT 101 | | SERVER 201 |
|---|---|---|
| INPUT : $(y_1, y_2, \ldots, y_n)$ AUTHENTICATION BIOMETRIC INFORMATION | | $(g^{R_1}, R_2)$ |
| | $\leftarrow$ | M |
| $r \leftarrow^R \mathbb{Z}_q$ $S = H(M, g^r)$ $A = \sum(R_1 x_i + R_2 r_i) \cdot y_i$ $\sigma_1 = r - A \cdot S$ $\sigma_2 = g^{\sum r_i y_i}$ $(S, \sigma_1, \sigma_2)$ | $\rightarrow$ | |
| | | $\{v_j = g^{\sigma_1}(\sigma_2)^{S \cdot R_2}(g^{R_1})^{a_j \cdot S}\}$ $\{H(M, v_j) = S'_j\}$ |
| | OK/NG $\leftarrow$ | OK IF THERE IS $S'_j$ SATISFYING $S = S'_j$ NG IF THERE IS NO $S'_j$ SATISFYING $S = S'_j$ |

FIG. 8

| CLIENT 101 | | SERVER 201 |
|---|---|---|
| INPUT : $(x_1, x_2, \ldots, x_n)$ REGISTERED BIOMETRIC INFORMATION | | |
| $(r_1, r_2, \ldots, r_n) \leftarrow^R \mathbb{Z}_q$ | | |
| $R_1, R_2, R_3 \leftarrow^R \mathbb{Z}_q$ | | |
| TEMPLATE : $\begin{cases} \{R_1 x_i + R_2 r_i + R_3\} \\ \{g^{r_i}\} \end{cases}$ | | |
| $g^{R_3}, R_1, R_2$ | $\rightarrow$ | |
| store(TEMPLATE) | | store($g^{R_3}, R_1, R_2$) |

FIG. 9

| CLIENT 101 | | SERVER 201 |
|---|---|---|
| INPUT : $(y_1, y_2, \ldots, y_n)$ AUTHENTICATION BIOMETRIC INFORMATION | | $(g^{R_3}, R_1, R_2)$ |
| $r \leftarrow^R \mathbb{Z}_q$ $\sigma = g^{\Sigma r_i y_i}$ | | |
| $g^r, \sigma$ | $\rightarrow$ | |
| | | $R' \leftarrow^R \mathbb{Z}_q$ |
| | $\leftarrow$ | $M, g^{R_3 \cdot R'}$ |
| $S = H(M, g^r)$ $A = \sum (R_1 x_i + R_2 r_i + R_3) \cdot y_i$ $\sigma_1 = r - A \cdot S$ $\sigma_2 = g^{\Sigma R_3 \cdot R' \cdot y_i}$ $(S, \sigma_1, \sigma_2)$ | $\rightarrow$ | |
| | | $v = \{g^{\sigma_1}(\sigma_2)^{S \cdot R_3}(g^{\Sigma r_i y_i})^{S \cdot R_2}(g^{-r})\}^{\left(-\frac{1}{R_1}\right)}$ |
| | OK/NG $\leftarrow$ | OK IF v IS INCLUDED IN $\Theta'$ NG IF v IS NOT INCLUDED IN $\Theta'$ |

COLLATION SYSTEM, CLIENT, AND SERVER

This application is a National Stage Entry of PCT/JP2019/022322 filed on Jun. 5, 2019, the contents of all of which are incorporated herein by reference, in their entirety.

TECHNICAL FIELD

The present invention relates to a collation system, a collation method, and a client, a server, a client program, and a server program applied to the collation system.

BACKGROUND ART

An example of authentication is biometric authentication. The "biometric authentication" is a method of personal authentication for confirming whether or not a person to be registered and a person to be authenticated match by collating biometric information of the person to be registered with biometric information of the person to be authenticated.

In addition, "biometric information" is data extracted from some features of an individual regarding a body or an action or data generated by converting the extracted data. This data may be referred to as a feature value.

In addition, a "template" is data including data generated from the biometric information of the person to be registered (hereinafter referred to as registered information) and stored in advance for the biometric authentication.

When the biometric authentication is performed in a client-server system, there are a mode of storing a template in a client and a mode of storing a template in a server.

Patent Literature (PTL) 1 and PTL 2 describe examples of an authentication device and an authentication method in which encrypted registered information (template) is stored in a server so that the registered information does not leak.

In addition, PTL 3 describes a collation system that can avoid leakage, spoofing, and the like with respect to a binary vector and enhances safety.

In addition, PTL 4 describes an authentication device configured to authenticate the validity of a subject ciphertext generated by encrypting a plaintext by homomorphic encryption.

An example of the mode of storing a template in a client includes fast identity online (FIDO). In FIDO, the template is stored in advance in the client. Further, if biometric information of a user (person to be authenticated) who is currently using the client is input to the client, the client determines whether or not the person to be authenticated corresponds to a person to be registered on the basis of the input biometric information and the template. Further, when the client determines that the person to be authenticated corresponds to the person to be registered, the server determines whether or not a signing key (secret key) included in the client and a verification key (public key) included in the server are paired keys on the basis of the signature generated by the client using the signing key. That is, in FIDO, when the biometric authentication succeeds in the client and the verification of the signature of the client succeeds in the server, it is finally determined that the authentication of the user (person to be authenticated) has succeeded.

In addition, in FIDO, data including information generated by encrypting biometric information of a person to be registered is stored in the client in advance as a template. Further, a key for decrypting the encrypted information is also stored in the client. If biometric information of a person to be authenticated is input to the client, the client decrypts a ciphertext of the biometric information included in the template using the key, and determines whether or not the person to be authenticated corresponds to the person to be registered using the decrypted biometric information and the input biometric information.

In addition, there is also a case where encrypted biometric information is stored in an integrated circuit (IC) chip of a cache card.

Here, a subject protected as personal information in "Act on Protection of Personal Information (hereinafter, it is referred to as the personal information protection law)" of Japan will be described. In the personal information protection law of Japan, biometric information that is information capable of identifying an individual is defined as personal information. Further, in the personal information protection law, it is defined that personal information managed in an electronic database or a paper database is to be protected by the personal information protection law.

In the mode of storing a template in a server, it can be said that templates of individual users using individual clients are stored as databases in a common server. Therefore, the templates stored in the server are subjects to be protected by the personal information protection law.

An administrator of a server is required to protect the server such that no template leaks. That is, the security cost increases as much as the server is protected.

On the other hand, in the mode of storing a template in a client, the client stores templates of one or a small number of users who use the client. Therefore, it is difficult to say that the templates are stored as databases. Therefore, there is a possibility that the templates stored in the client are not subjects to be protected by the personal information protection law.

CITATION LIST

Patent Literature

PTL 1: Japanese Patent Application Laid-Open No. 2011-211593
PTL 2: Japanese Patent Application Laid-Open No. 2009-129292
PTL 3: International Publication No. WO 2018/110608
PTL 4: Japanese Patent Application Laid-Open No. 2014-220661

SUMMARY OF INVENTION

Technical Problem

Even when a template is stored in a client, it is preferable to prevent leakage of biometric information of a user from the client.

In addition, not only when authentication is performed using a living body but also when authentication is performed using a password or when authentication is performed using a secret key stored in an IC card or the like, it is preferable to prevent leakage of secret information of the user such as the password or the secret key from the client in a case where registered information (corresponding to the template in the biometric authentication) including data generated from the password or the secret key is stored in the client of a client-server system.

Therefore, an object of the present invention is to provide a collation system, a collation method, and a client, a server, a client program, and a server program applied to the collation system which can prevent leakage of secret information of a user from a client even when concealed information generated by concealing registered information is stored in the client.

Solution to Problem

A collation system according to the present invention is a collation system which employs a challenge response method including a client and a server. The client includes: a random number generation unit which generates a random number; a concealed information storage unit which stores concealed information generated by concealing registered information and the generated random number using a secret key; and a response computation unit which, on the basis of a challenge transmitted from the server, the collation information input for collation with the registered information, and the concealed information, computes a response corresponding to the challenge and including a concealed index, generated by concealing an index indicating closeness between the registered information and the collation information. The server includes: a challenge generation unit which generates the challenge using a public key corresponding to the secret key; and a determination unit which uses the public key and the random number transmitted from the client to determine whether or not the response transmitted from the client corresponds to the challenge.

In addition, a collation system according to the present invention is a collation system which employs a challenge response method including a client and a server. The client includes: a random number generation unit which generates a random number; and a concealed information storage unit which stores concealed information generated by concealing registered information and the generated random number using a secret key.

In addition, a collation system according to the present invention is a collation system which employs a challenge response method including a client and a server. The client includes a response computation unit which, on the basis of a challenge transmitted from the server, the collation information input for collation with the registered information, and concealed information generated by concealing the registered information and a random number using a secret key, computes a response corresponding to the challenge and including a concealed index, generated by concealing an index indicating closeness between the registered information and the collation information. The server includes: a challenge generation unit which generates the challenge using a public key corresponding to the secret key; and a determination unit which uses the public key and the random number transmitted from the client to determine whether or not the response transmitted from the client corresponds to the challenge.

In addition, a client according to the present invention includes: a random number generation unit which generates a random number; a concealed information storage unit which stores concealed information generated by concealing registered information and the generated random number using a secret key; and a response computation unit which, on the basis of a challenge generated by using a public key corresponding to the secret key, the collation information input for collation with the registered information, and the concealed information, computes a response corresponding to the challenge and including a concealed index, generated by concealing an index indicating closeness between the registered information and the collation information.

In addition, a server according to the present invention includes: a challenge generation unit which generates a challenge using a public key corresponding to a secret key; and a determination unit which determines whether or not a response corresponds to a generated challenge, using the public key and a random number transmitted from a client, the response including a concealed index, generated by concealing the index indicating closeness between registered information and collation information and computed on the basis of the challenge, the collation information input for collation with the registered information, and the concealed information generated by concealing the registered information and the random number using the secret key.

In addition, a collation method according to the present invention is a collation method in a collation system which includes a client and a server and employs a challenge response method. The collation method includes: causing the client to generate a random number, to transmit the generated random number to the server, to store concealed information generated by concealing registered information and the generated random number using a secret key in a concealed information storage unit, to compute, on the basis of a challenge generated by using a public key corresponding to the secret key and transmitted from the server, the collation information input for collation with the registered information, and the concealed information, a response corresponding to the challenge and including a concealed index, generated by concealing an index indicating closeness between the registered information and the collation information, and to transmit the computed response to the server; and causing the server to use the public key and the transmitted random number to determine whether or not the transmitted response corresponds to the challenge.

In addition, a collation method according to the present invention is a collation method in a client, including: generating a random number; storing concealed information generated by concealing registered information and the generated random number using a secret key in a concealed information storage unit; and computing, on the basis of a challenge generated by using a public key corresponding to the secret key, the collation information input for collation with the registered information, and the concealed information, a response corresponding to the challenge and including a concealed index, generated by concealing an index indicating closeness between the registered information and the collation information.

In addition, a collation method according to the present invention is a collation method in a server, including: generating a challenge using a public key corresponding to a secret key; and determining whether or not a response corresponds to a generated challenge, using the public key and a random number transmitted from a client, the response including a concealed index, generated by concealing the index indicating closeness between registered information and collation information and computed on the basis of the challenge, the collation information input for collation with the registered information, and the concealed information generated by concealing the registered information and the random number using the secret key.

In addition, a client program according to the present invention is a client program installed in a computer, which includes a concealed information storage unit which stores concealed information generated by concealing registered information and a random number using a secret key and operates as a client, causing the computer to execute a computation process of computing, on the basis of a challenge generated by using a public key corresponding to the secret key, the collation information input for collation with the registered information, and the concealed information, a response corresponding to the challenge and including a concealed index, generated by concealing an index indicating closeness between the registered information and the collation information.

In addition, a server program according to the present invention is a server program installed in a computer, which operates as a server, causing the computer to execute: a generating process of generating a challenge using a public key corresponding to a secret key, and a determination process of determining whether or not a response corresponds to a generated challenge, using the public key and a random number transmitted from a client, the response including a concealed index, generated by concealing the index indicating closeness between registered information and collation information and computed on the basis of the challenge, the collation information input for collation with the registered information, and the concealed information generated by concealing the registered information and the random number using the secret key.

Advantageous Effects of Invention

According to the present invention, it is possible to prevent the leakage of the secret information of the user from the client even when the concealed information generated by concealing the registered information is stored in the client.

BRIEF DESCRIPTION OF DRAWINGS

FIG. 5 is a flowchart showing an example of a processing progress during authentication in a collation system 11 according to the second exemplary embodiment.

FIG. 6 is an explanatory diagram showing an example of a specific registration process in the collation system 11.

FIG. 7 is an explanatory diagram showing an example of a specific authentication process in the collation system 11.

FIG. 8 is an explanatory diagram showing another example of a specific registration process in the collation system 11.

FIG. 9 is an explanatory diagram showing another example of a specific authentication process in the collation system 11.

DESCRIPTION OF EMBODIMENTS

Hereinafter, each exemplary embodiment of the present invention will be described with reference to the accompanying drawings. In the following description, a case where a collation system of the present invention is applied to biometric authentication will be described as an example. The present invention can also be considered as a type of two-factor authentication including authentication using a living body and authentication using knowledge regarding a template. However, the collation system of the present invention may be applied to authentication other than the biometric authentication.

First Exemplary Embodiment

Figure 1:
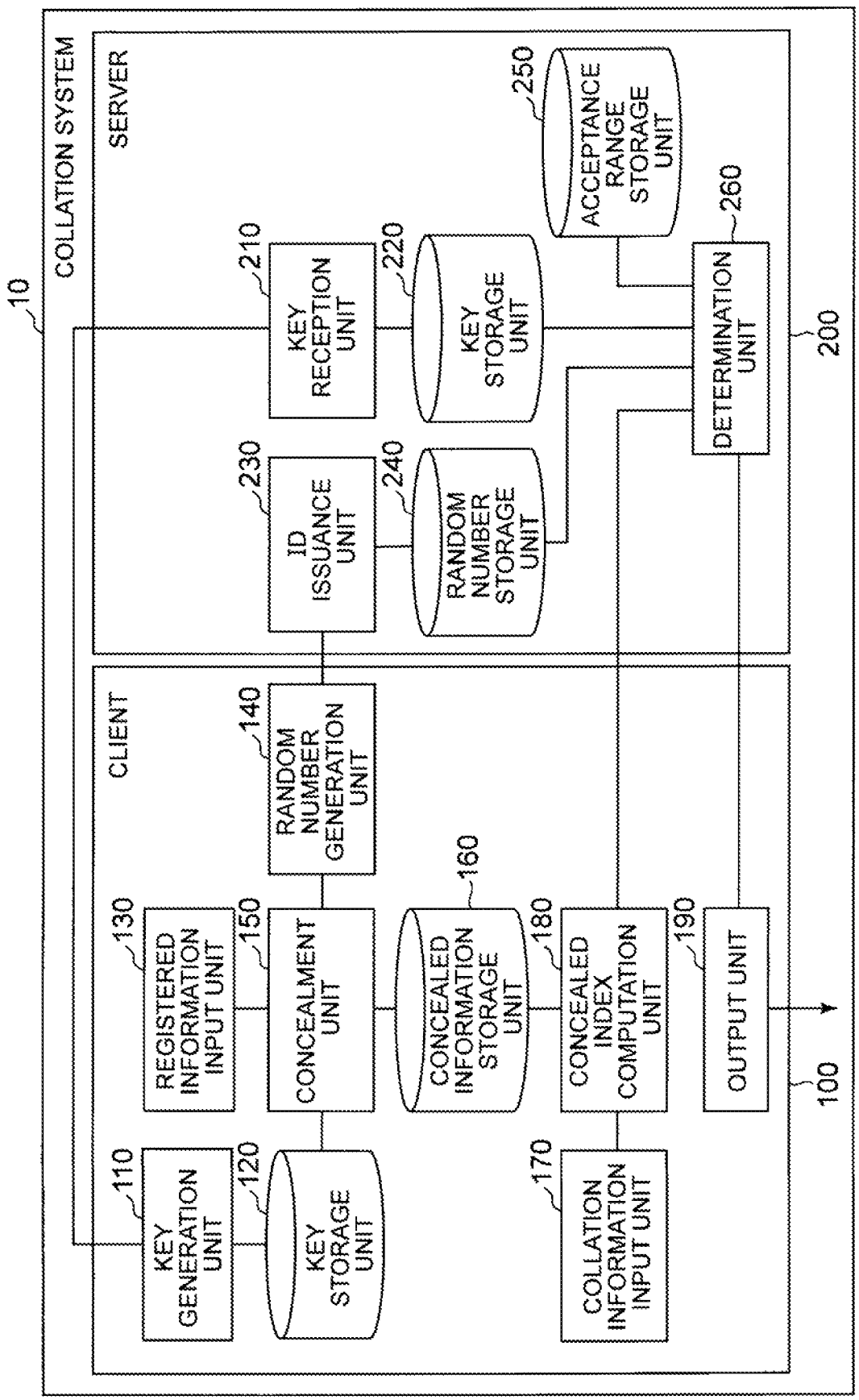
FIG. 1 is a block diagram showing a configuration example of a collation system according to a first exemplary embodiment of the present invention.

FIG. 1 is a block diagram showing a configuration example of a collation system according to a first exemplary embodiment of the present invention. A collation system 10 shown in FIG. 1 includes a client 100 and a server 200. Note that FIG. 1 shows one client 100, but a plurality of the clients 100 may be provided. The client 100 and the server 200 can communicate with each other via a communication network. Hereinafter, each constituent element of the collation system 10 of the present exemplary embodiment will be described.

As shown in FIG. 1, the client 100 includes a key generation unit 110, a key storage unit 120, a registered information input unit 130, a random number generation unit 140, a concealment unit 150, a concealed information storage unit 160, a collation information input unit 170, a concealed index computation unit 180, and an output unit 190.

In the collation system 10 of the present exemplary embodiment, an electronic signature based on a public key cryptosystem is adopted. The key generation unit 110 generates a public key and a secret key. Hereinafter, the public key is referred to as pk, and the secret key is referred to as sk. The key generation unit 110 generates the public key pk and the secret key sk without depending on biometric information (in other words, without using biometric information).

The key generation unit 110 generates the public key pk and the secret key sk using a parameter (which is called a security parameter and generally means a key length) indicating the strength of safety. This operation can be expressed as follows if the security parameter is κ.

$$(pk, sk) \leftarrow \text{KeyGen}(1^\kappa)$$

In addition, the key generation unit 110 transmits the generated public key pk to the server 200. Note that the secret key sk is not transmitted to the server 200.

In the present exemplary embodiment, a case where the key generation unit 110 generates a pair of the public key pk and the secret key sk and transmits the public key pk to the server 200 will be described as an example.

The public key pk transmitted to the server 200 by the key generation unit 110 is received by a key reception unit 210 of the server 200 and stored in a key storage unit 220 of the server 200.

The key storage unit 120 is a storage device that stores the public key pk. Note that the key storage unit 120 does not necessarily store the public key pk when the public key pk is unnecessary.

The registered information input unit 130 receives an input of registered information. In the present exemplary embodiment, biometric information of a person to be registered is input to the registered information input unit 130 as the registered information.

Note that a case where the registered information and collation information (information input for collation with the registered information) to be described later are represented by vectors having a common dimension will be described as an example in the present exemplary embodiment.

The registered information input unit 130 may be any input device according to the registered information. For example, when biometric information extracted from a fingerprint is set as the registered information, the registered information input unit 130 may be an input device that reads the fingerprint, extracts a vector serving as the registered information from the fingerprint, and receives the vector as an input. In addition, the registered information input unit 130 may be an input device to which a vector serving as the registered information is directly input.

Note that the biometric information may be extracted from an iris, a retina, a face, a blood vessel (vein), a palm print, a voiceprint, or a combination thereof, in addition to the fingerprint in the present exemplary embodiment. The biometric information may be extracted from other types of information capable of identifying a living body other than the above-described examples.

A vector corresponding to the biometric information (registered information) of the person to be registered input to the registered information input unit 130 is referred to as X.

The random number generation unit 140 generates a random number R. The random number generation unit 140 inputs the generated random number R to the concealment unit 150. In addition, the random number generation unit 140 transmits the generated random number R to the server 200.

The concealment unit 150 conceals the biometric information X of the person to be registered input to the registered information input unit 130 and the input random number R using the secret key sk. That is, it can be also said that the secret key sk is a concealment key. After the concealing, the concealment unit 150 deletes the secret key sk in order to prevent leakage. In addition, the random number generation unit 140 deletes the random number R in order to prevent leakage. In addition, the concealment unit 150 stores information generated by concealing the biometric information X and the random number R (also referred to as concealed information) in the concealed information storage unit 160.

The concealed information storage unit 160 is a storage device that stores the concealed information and a user ID transmitted from the server 200 together.

The concealed information is data generated from the biometric information of the person to be registered stored in advance for biometric authentication. Therefore, the concealed information is included in a template. Note that the secret key sk is not data generated from the biometric information of the person to be registered and is not included in the template.

In the present exemplary embodiment, encryption will be described as a specific example of concealment. That is, the concealment unit 150 encrypts the biometric information X of the person to be registered input to the registered information input unit 130 and the random number R input from the random number generation unit 140, and stores the encrypted biometric information X (referred to as Enc(R, X)) in the concealed information storage unit 160. The concealment unit 150 encrypts the biometric information X of the person to be registered and the random number R using the secret key sk to generate Enc(R, X).

The information input for collation with the registered information is referred to as the collation information. The collation information input unit 170 receives an input of the collation information. In the present exemplary embodiment, the biometric information of the person to be authenticated is input to the collation information input unit 170 as the collation information. As described above, the registered information and the collation information are represented by vectors of a common dimension.

The collation information input unit 170 may be any input device according to the collation information. For example, when biometric information extracted from a fingerprint is set as the collation information, the collation information input unit 170 may be an input device that reads the fingerprint, extracts a vector serving as the collation information from the fingerprint, and receives the vector as an input. In addition, the collation information input unit 170 may be an input device to which a vector serving as the collation information is directly input. In addition, the registered information input unit 130 and the collation information input unit 170 may be a common input device.

A vector corresponding to the biometric information (collation information) of the person to be authenticated input to the collation information input unit 170 is referred to as Y.

The concealed index computation unit 180 computes data (hereinafter, referred to as a concealed index) generated by encrypting an index, which is a value indicating the closeness between the biometric information X and the biometric information Y, on the basis of the biometric information Y of the person to be authenticated and a template (that is, Enc(R, X) obtained by encrypting the biometric information X of the person to be registered and the random number R).

At this time, the concealed index computation unit 180 computes the concealed index without decrypting the template Enc(R, X). Note that it can be said that the decryption is release of concealment. The concealed index computation unit 180 transmits the computed concealed index and the user ID stored in the concealed information storage unit 160 together with the template to the server 200.

The output unit 190 receives authentication result information indicating a result of the biometric authentication transmitted from the server 200. In addition, the output unit 190 outputs the received authentication result information to the outside of the client 100.

The key generation unit 110, the random number generation unit 140, the concealed index computation unit 180, and the output unit 190 are, for example, realized by a central processing unit (CPU) of a computer that operates according to a client program and a communication interface of the computer. For example, the CPU may read the client program from a program recording medium such as a program storage device of the computer, and operate as the key generation unit 110, the random number generation unit 140, the concealed index computation unit 180, and the output unit 190 using the communication interface according to the program. In addition, the concealment unit 150 is realized by, for example, a CPU of a computer that operates according to the client program. For example, the CPU may read the client program from the program recording medium as described above, and operate as the concealment unit 150 according to the program.

The key storage unit 120 and the concealed information storage unit 160 are realized by, for example, a storage device provided in the computer.

In addition, the server 200 includes the key reception unit 210, the key storage unit 220, an ID issuance unit 230, a random number storage unit 240, an acceptance range storage unit 250, and a determination unit 260 as shown in FIG. 1.

The key reception unit 210 receives the public key pk generated by the client 100 and transmitted from the client 100, and stores the public key pk in the key storage unit 220.

The key storage unit 220 is a storage device that stores the public key pk.

The ID issuance unit 230 issues one user ID to one client 100 that has transmitted the random number R. The ID issuance unit 230 transmits the issued user ID to the client 100.

In addition, the ID issuance unit 230 inputs a set of the transmitted random number R and the issued user ID to the random number storage unit 240. The random number storage unit 240 is a storage device that stores the set of the random number R and the user ID.

The determination unit 260 uses a release key (the public key pk) corresponding to the concealment key (secret key sk) stored in the key storage unit 220 and the random number R stored in the random number storage unit 240 together with the transmitted user ID to determine whether or not an index can be acquired from the transmitted concealed index. That is, it can be also said that the public key pk is the release key.

If the index can be acquired from the transmitted concealed index, the determination unit 260 acquires the index. Next, the determination unit 260 determines whether or not the collation information and the registered information correspond to each other on the basis of the index acquired from the concealed index after having been determined to be acquirable. Specifically, the determination unit 260 determines whether or not the person to be registered and the person to be authenticated match by determining whether or not the index obtained from the concealed index is a value within a predetermined acceptance range. Note that the predetermined acceptance range is stored in the acceptance range storage unit 250.

That is, if the index acquired from the concealed index is the value within the acceptance range, the determination unit 260 determines that the person to be registered and the person to be authenticated match. The fact that the person to be registered and the person to be authenticated match corresponds to the fact that the collation information and the registered information correspond to each other. In addition, if the index acquired from the concealed index is not the value within the acceptance range, the determination unit 260 determines that the person to be registered and the person to be authenticated do not match. The determination unit 260 transmits authentication result information indicating a result of the determination to the client 100.

When the person to be registered and the person to be authenticated match, it is determined that the authentication has succeeded, and processing after the authentication may be executed. For example, as an example, the server 200 transmits a determination result of the determination unit 260 to the client 100, and the client 100 may execute the processing after the authentication determining that the authentication has succeeded when receiving the determination result that the person to be registered and the person to be authenticated match. However, a device that executes the processing after the authentication is not limited to the client 100, and a device other than the client 100 may execute the processing after the authentication on condition that the determination result indicating that the person to be registered and the person to be authenticated match is obtained.

The key reception unit 210, the ID issuance unit 230, and the determination unit 260 are realized by, for example, a CPU of a computer operating according to a server program and a communication interface of the computer. For example, the CPU may read the server program from a program recording medium such as a program storage device of the computer, and operate as the key reception unit 210, the ID issuance unit 230, and the determination unit 260 using the communication interface according to the program.

The key storage unit 220, the random number storage unit 240, and the acceptance range storage unit 250 are realized by, for example, a storage device provided in the computer.

Note that the server 200 does not necessarily include the ID issuance unit 230. That is, the user ID is not an essential element in the present exemplary embodiment.

In addition, when the electronic signature is not adopted for the collation system 10, the key generation unit 110 that generates the secret key sk and the public key pk may be provided in the server 200, instead of the client 100.

When the key generation unit 110 is provided in the server 200, the key generation unit 110 transmits the generated public key pk to the client 100. The key storage unit 120 stores the transmitted public key pk. In addition, the key storage unit 220 stores the generated public key pk and secret key sk.

In addition, the concealment unit 150 conceals the biometric information X of the person to be registered and the random number R using the public key pk. That is, it can be also said that the public key pk is the concealment key. In addition, the determination unit 260 acquires an index from the received concealed index using the secret key sk stored in the key storage unit 220 and the random number R stored in the random number storage unit 240 together with the received user ID. That is, it can be also said that the secret key sk is the release key.

Figure 2:
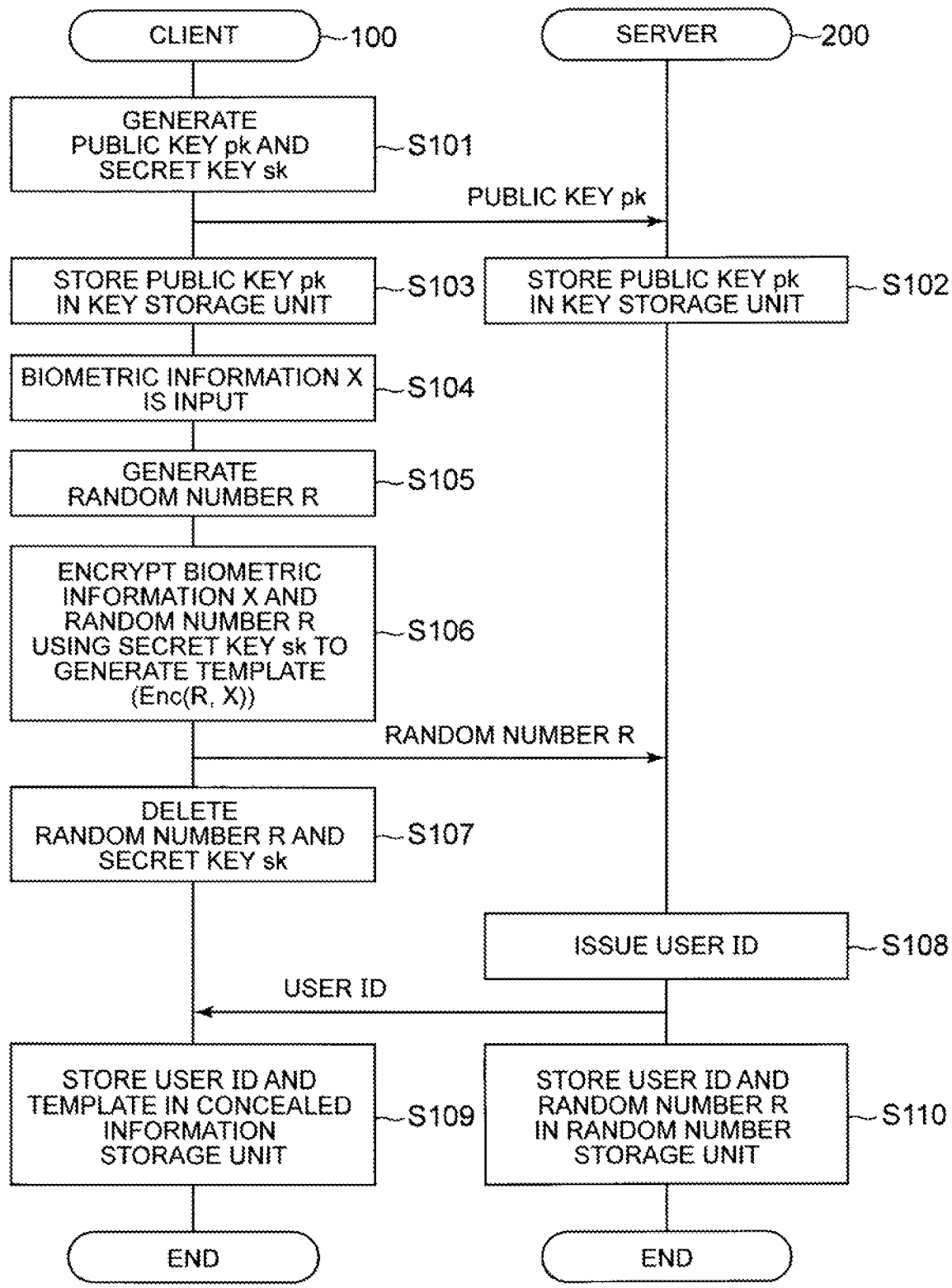
FIG. 2 is a flowchart showing an example of a processing progress when a template is stored in advance in a concealed information storage unit 160 of a client 100 according to the first exemplary embodiment.

Next, a processing progress will be described. FIG. 2 is a flowchart showing an example of the processing progress when a template is stored in advance in the concealed information storage unit 160 of the client 100 according to the first exemplary embodiment. That is, the processing progress shown in FIG. 2 is a processing progress of a template registration process. Note that details of items that have been already described will be omitted.

First, the key generation unit 110 of the client 100 generates the public key pk and the secret key sk (Step S101). At this time, the key generation unit 110 generates the public key pk and the secret key sk without using the biometric information X. Next, the key generation unit 110 transmits the public key pk generated in Step S101 to the server 200.

Further, the key reception unit 210 of the server 200 receives the public key pk from the client 100. The key reception unit 210 stores the public key pk in the key storage unit 220 (Step S102). In addition, the key generation unit 110 stores the generated public key pk in the key storage unit 120 (Step S103). However, the key generation unit 110 does not necessarily store the public key pk in the key storage unit 120 when the public key pk is unnecessary.

Thereafter, the biometric information X of the person to be registered is input to the registered information input unit 130 (Step S104). Next, the random number generation unit 140 generates the random number R (Step S105). The random number generation unit 140 inputs the generated random number R to the concealment unit 150.

Next, the concealment unit 150 generates the template (Enc(R, X)) by encrypting the random number R and the biometric information X using the secret key sk (Step S106).

Next, the random number generation unit 140 transmits the generated random number R to the server 200. After the transmission, the random number generation unit 140 deletes the random number R. In addition, the concealment unit 150 deletes the secret key sk (Step S107).

When receiving the transmitted random number R, the ID issuance unit 230 issues a user ID (Step S108). The ID issuance unit 230 transmits the issued user ID to the client 100.

The random number generation unit 140 receives the transmitted user ID. The random number generation unit 140 inputs the received user ID to the concealment unit 150. Next, the concealment unit 150 stores the received user ID in the concealed information storage unit 160 together with the template generated in Step S106 (Step S109).

In addition, the ID issuance unit 230 stores the issued user ID together with the received random number R in the random number storage unit 240 (Step S110).

Note that the processing progress described above with reference to FIG. 2 may be repeatedly executed. In addition, the processing progress when the template is stored in advance is not limited to the example shown in FIG. 2. For example, Step S104 may be executed before Step S101.

Figure 3:
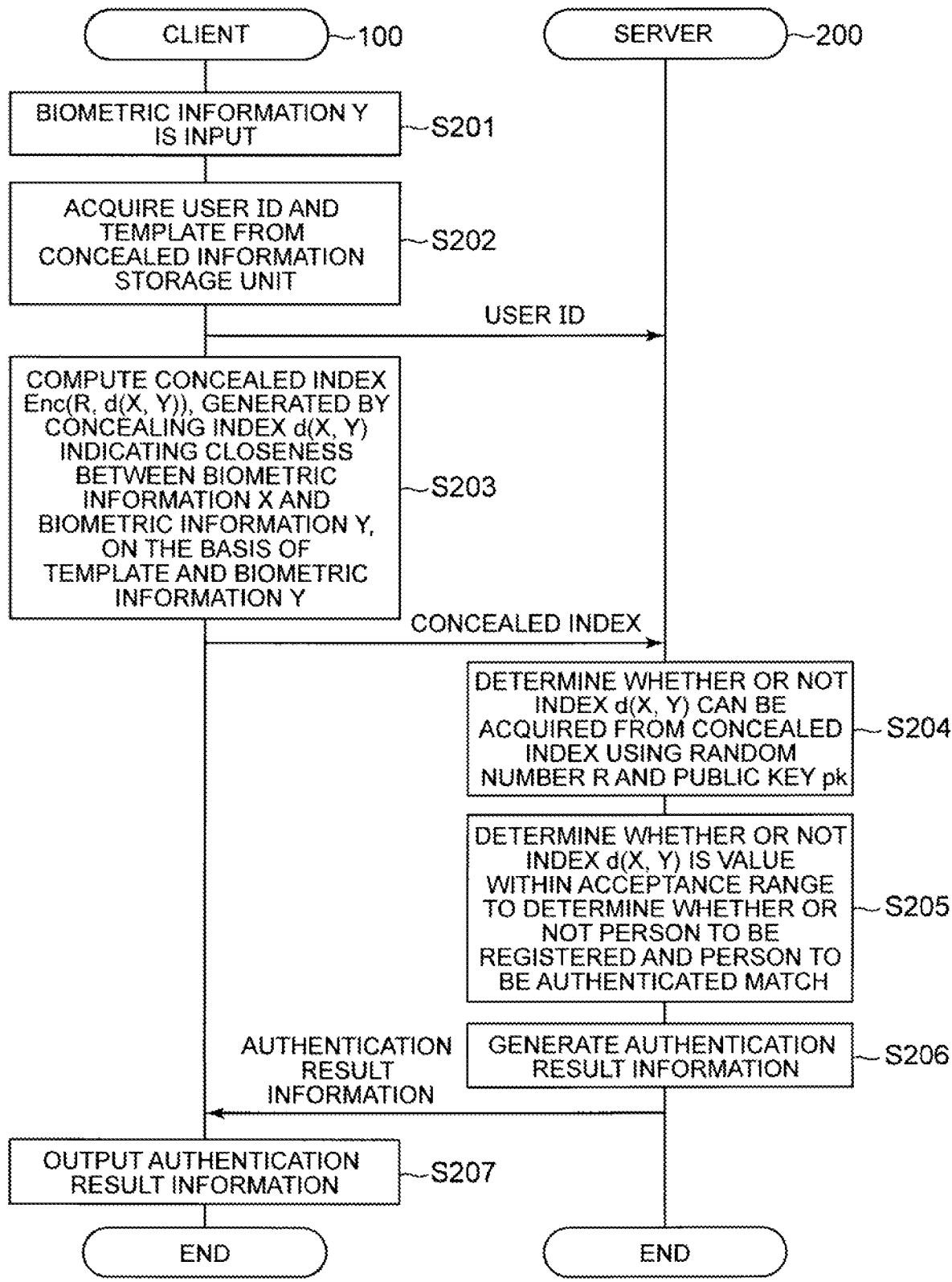
FIG. 3 is a flowchart showing an example of a processing progress during authentication in a collation system 10 according to the first exemplary embodiment.

FIG. 3 is a flowchart showing an example of a processing progress during authentication in the collation system 10 according to the first exemplary embodiment. Note that details of items that have been already described will be omitted.

First, the biometric information Y of the person to be authenticated is input to the collation information input unit 170 (Step S201).

Next, the concealed index computation unit 180 acquires a user ID and a template together from the concealed information storage unit 160 (Step S202). The concealed index computation unit 180 transmits the acquired user ID to the server 200. The determination unit 260 of the server 200 receives the user ID from the client 100.

Next, the concealed index computation unit 180 computes a concealed index (Enc(R, d(X, Y))), generated by concealing an index d(X, Y) indicating closeness between the biometric information X and the biometric information Y, on the basis of the biometric information Y input in Step S201 and the template (Enc(R, X)) acquired in Step S202 (Step S203). In Step S203, the concealed index computation unit 180 computes the concealed index without decrypting Enc (R, X).

Next, the concealed index computation unit 180 transmits the concealed index computed in Step S203 to the server 200. The determination unit 260 of the server 200 receives the concealed index from the client 100.

Next, the determination unit 260 determines whether or not the index d(X, Y) can be acquired from the received concealed index using the public key pk stored in the key storage unit 220 and the random number R stored in the random number storage unit 240 together with the received user ID (Step S204). The public key pk is the public key generated in Step S101.

Next, the determination unit 260 determines whether or not the index d(X, Y), acquired from the concealed index after having been determined to be acquirable, is a value within the predetermined acceptance range to determine whether or not the person to be registered and the person to be authenticated match (Step S205). Note that the determination unit 260 does not necessarily perform the processing of Step S205 when the index d(X, Y) is not acquired from the received concealed index.

When the index d(X, Y) is the value within the acceptance range, the determination unit 260 generates authentication result information indicating "authentication success" determining that the person to be registered and the person to be authenticated match. In addition, when the index d(X, Y) is not the value within the acceptance range, the determination unit 260 generates authentication result information indicating "authentication failure" determining that the person to be registered and the person to be authenticated do not match (Step S206).

Next, the determination unit 260 transmits the generated authentication result information to the client 100. Further, the output unit 190 of the client 100 receives the authentication result information transmitted from the server 200. Next, the output unit 190 outputs the received authentication result information (Step S207).

Note that the authentication result information may be directly output from the server 200. In addition, the processing progress described above with reference to FIG. 3 may be repeatedly executed.

DESCRIPTION OF EFFECT

There is a possibility that a template stored in a client is not a subject to be protected by the personal information protection law as described above. However, biometric information is personal information that does not change for a lifetime, and thus, it is preferable to prevent leakage.

In addition, even if biometric information to be used for service provided by a certain business operator is stored only in a client as the template, there is a possibility that the responsibility of the business operator is pursued when the biometric information leaks.

In addition, there is a risk that the biometric information leaks from the client when the client is infected with malware or the like. However, this risk is difficult to overcome by efforts of a service provider.

In FIDO, data including information generated by encrypting biometric information of a person to be registered is stored in a client in advance as a template. When biometric information of a person to be authenticated is input, the client decrypts a ciphertext of the biometric information included in the template using a key. At this time, there is a possibility that the biometric information obtained by decryption leaks. In addition, a third party can obtain the biometric information by decrypting the template when the template and the key are stolen together by the third party.

In addition, an IC chip of a cash card has tamper resistance. However, in a case where biometric authentication is performed outside the IC chip, there is a possibility that the decrypted biometric information leaks if the encrypted biometric information stored in the IC chip is decrypted and transmitted outside the IC chip.

According to the present exemplary embodiment, the key generation unit 110 of the client 100 generates the public key pk and the secret key sk without using the biometric information X. Further, the key reception unit 210 of the server 200 receives the public key pk from the client 100, and stores the public key pk in the key storage unit 220 of the server 200. In addition, if the biometric information X is input to the client 100, the concealment unit 150 generates a template by encrypting the biometric information X using the secret key sk and the random number R generated without using the biometric information X, and stores the template in the concealed information storage unit 160 of the client 100. Therefore, the template can be stored in the client 100 according to the present exemplary embodiment. Further, since the template is encrypted, the biometric information X or a part of the biometric information X can be prevented from leaking from the template. Since the server 200 does not have any information on the biometric information X, the leakage of the biometric information X or a part of the biometric information X from the server 200 hardly occurs.

In addition, during authentication, the concealed index computation unit 180 computes a concealed index, generated by concealing an index indicating closeness between the biometric information X and the biometric information Y, on the basis of the input biometric information Y and the template. Next, the determination unit 260 uses the random number R stored in the random number storage unit 240 together with the transmitted user ID and the public key pk stored in the key storage unit 220 to acquire the index indicating the closeness between the biometric information X and the biometric information Y from the concealed index. The determination unit 260 determines whether or not the acquired index is the value within the acceptance range to determine whether or not the person to be registered and the person to be authenticated match.

The random number R stored in the random number storage unit 240 of the present exemplary embodiment together with the user ID is the random number used to generate the template corresponding to the user ID. That is, if the index indicating the closeness between the biometric information X and the biometric information Y corresponding to the user ID is acquired using the random number R stored together with the user ID, it is confirmed that the concealed index has been computed using the registered biometric information X. Accordingly, the collation system 10 of the present exemplary embodiment can prevent an attack that generates a concealed index using false biometric information and performs spoofing authentication using the generated concealed index.

Second Exemplary Embodiment

Figure 4:
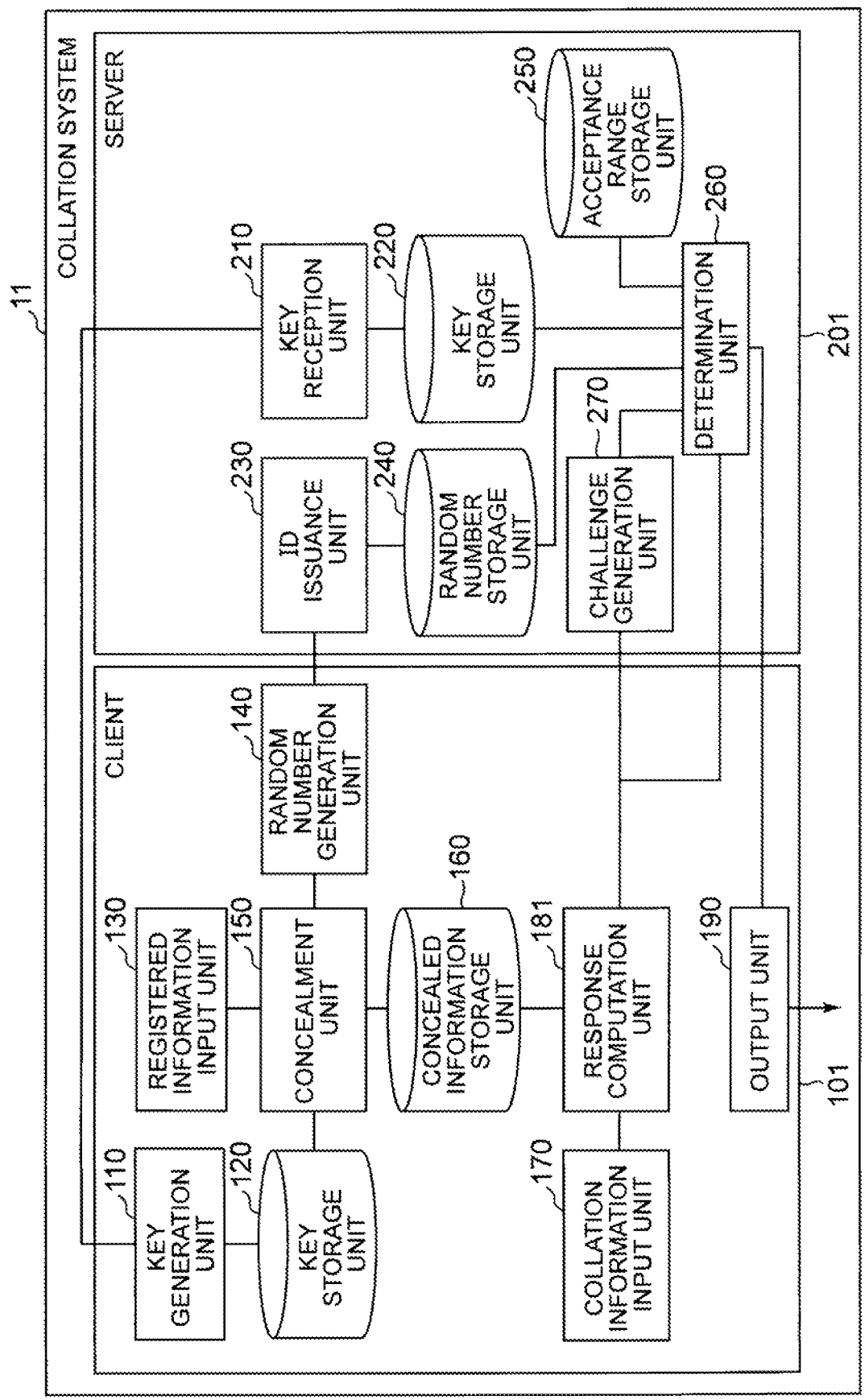
FIG. 4 is a block diagram showing a configuration example of a collation system according to a second exemplary embodiment of the present invention.

FIG. 4 is a block diagram showing a configuration example of a collation system according to a second exemplary embodiment of the present invention. A collation system 11 shown in FIG. 4 includes a client 101 and a server 201. Note that FIG. 4 shows one client 101, but a plurality of the clients 101 may be provided. The client 101 and the server 201 can communicate with each other via a communication network.

For example, it is assumed that an attacker intercepts authentication information transmitted from a client to a server. Then, the attacker executes a re-transmission attack of retransmitting or processing and transmitting the intercepted authentication information to the server, and there is a possibility that the server accepts the re-transmitted authentication information as authentication information transmitted from the client.

In this case, the attacker can execute spoofing by spoofing the client and succeeding in authentication on the server through the above-described re-transmission attack.

In the collation system 11 of the present exemplary embodiment, a challenge response method is introduced so as to prevent the spoofing. Specifically, the server 201 transmits a different challenge to the client 101 every time for each authentication to cause the client 101 to compute a response that corresponds to the challenge and includes closeness between registered information and collation information, so that a value of the response is changed for each authentication.

Even if the attacker intercepts the value of the response, the intercepted value is no longer usable in the next authentication, and it is difficult for the attacker to generate a response corresponding to another challenge, so that spoofing such as a re-transmission attack is prevented. Hereinafter, each constituent element of the collation system 11 of the present exemplary embodiment will be described.

The client 101 of the present exemplary embodiment includes a response computation unit 181, instead of the concealed index computation unit 180 provided in the client 100 of the first exemplary embodiment. Functions of the respective constituent elements other than the response computation unit 181 are similar to the functions of the corresponding constituent elements provided in the client 100.

The response computation unit 181 computes a response corresponding to a challenge on the basis of the biometric information Y of a person to be authenticated, a template, the public key pk, and the challenge transmitted from the server 201. The computed response includes an index that is a value indicating closeness between the biometric information X and the biometric information Y. In addition, the computed response itself is encrypted.

At this time, the response computation unit 181 computes a response without decrypting the template Enc(R, X). The response computation unit 181 transmits the computed response to the server 201.

In addition, the server 201 of the present exemplary embodiment includes a challenge generation unit 270. Functions of the respective constituent elements other than the determination unit 260 and the challenge generation unit 270 are similar to the functions of the corresponding constituent elements provided in the server 200.

The challenge generation unit 270 generates a challenge. The challenge generation unit 270 transmits the generated challenge to the client 101.

The determination unit 260 receives the response transmitted from the client 101. The determination unit 260 determines whether or not the received response is a response corresponding to the transmitted challenge using the public key pk stored in the key storage unit 220 and the random number R stored in the random number storage unit 240. As an example of the determination, the determination unit 260 determines whether or not the received response can be decrypted using the public key pk.

When the received response corresponds to the transmitted challenge, the determination unit 260 determines whether or not an index included in the response is a value within a predetermined acceptance range. The determination unit 260 determines whether or not a person to be registered and the person to be authenticated match by determining whether or not the index is the value within the acceptance range. Note that the determination unit 260 uses the acceptance range stored in the acceptance range storage unit 250 for the determination.

That is, if the index included in the response is the value within the acceptance range, the determination unit 260 determines that the person to be registered and the person to be authenticated match. In addition, if the index included in the response is not the value within the acceptance range, the determination unit 260 determines that the person to be registered and the person to be authenticated do not match. The determination unit 260 transmits authentication result information indicating a result of the determination to the client 101.

The response computation unit 181 is realized by, for example, a CPU of a computer that operates according to a client program and a communication interface of the computer. For example, the CPU may read the client program from a program recording medium such as a program storage device of the computer, and operate as the response computation unit 181 using the communication interface according to the program.

In addition, the challenge generation unit 270 is realized by, for example, a CPU of a computer that operates according to a server program and a communication interface of the computer. For example, the CPU may read the server program from a program recording medium such as a program storage device of the computer, and operate as the challenge generation unit 270 using the communication interface according to the program.

Next, a processing progress will be described. The processing progress when a template is stored in advance in the concealed information storage unit 160 of the client 101 is similar to the processing progress shown in FIG. 2.

FIG. 5 is a flowchart showing an example of a processing progress during authentication in the collation system 11 according to the second exemplary embodiment. Note that details of items that have been already described will be omitted.

First, the biometric information Y of the person to be authenticated is input to the collation information input unit 170 (Step S211).

Next, the response computation unit 181 acquires a user ID and a template together from the concealed information storage unit 160 (Step S212). The response computation unit 181 transmits the acquired user ID to the server 201. The determination unit 260 of the server 201 receives the user ID from the client 101.

Next, the challenge generation unit 270 generates a challenge (Step S213). The challenge generation unit 270 transmits the generated challenge to the client 101.

Next, the response computation unit 181 receives the transmitted challenge.

Next, the response computation unit 181 computes a response including an index indicating closeness between the biometric information X and the biometric information Y using the public key pk on the basis of the biometric information Y input in Step S211, the template acquired in Step S212, and the received challenge (Step S214).

Next, the response computation unit 181 transmits the response computed in Step S214 to the server 201. Further, the determination unit 260 of the server 201 receives the response transmitted from the client 101.

Next, the determination unit 260 determines whether or not the received response is a response corresponding to the transmitted challenge using the public key pk stored in the key storage unit 220 and the random number R stored in the random number storage unit 240 together with the received user ID (Step S215).

When the received response corresponds to the transmitted challenge, the determination unit 260 determines whether or not the index included in the response is a value within a predetermined acceptance range to determine whether or not the person to be registered and the person to be authenticated match (Step S216). Note that the determination unit 260 does not necessarily perform the processing of Step S216 when the received response does not correspond to the transmitted challenge.

When the index included in the response is the value within the acceptance range, the determination unit 260 generates authentication result information indicating "authentication success" determining that the person to be registered and the person to be authenticated match. In addition, when the received response does not correspond to the transmitted challenge or when the index included in the response is not the value within the acceptance range, the determination unit 260 generates authentication result information indicating "authentication failure" determining that the person to be registered and the person to be authenticated do not match (Step S217).

Next, the determination unit 260 transmits the generated authentication result information to the client 101. Further, the output unit 190 of the client 101 receives the authentication result information transmitted from the server 201. Next, the output unit 190 outputs the received authentication result information (Step S218).

Note that the authentication result information may be directly output from the server 201. In addition, the processing progress described above with reference to FIG. 5 may be repeatedly executed.

Hereinafter, each specific example of an authentication phase of the present exemplary embodiment will be described. It is assumed that both the biometric information X and the biometric information Y are n-dimensional vectors in the following description. Further, each element of X is represented as $X=(x_1, \ldots, x_n)$, and each element of Y is represented as $Y=(y_1, \ldots, y_n)$. In addition, a symbol i represents $1, \ldots,$ and n. For example, $=u_1, u_2, \ldots, u_n$.

Specific Example 1

In the present specific example, a case is considered in which an index indicating closeness between the biometric information X and the biometric information Y is the Hamming distance between the biometric information X and the biometric information Y. Hereinafter, the case where the index is the Hamming distance will be described as an example. Hereinafter, an example of processing in the case where the index is the Hamming distance will be described.

In the case where the index is the Hamming distance, each of the elements $x_1$ to $x_n$ of the biometric information X and the elements $y_1$ to $y_n$ of the biometric information Y is assumed to be a value of 0 or 1. The Hamming distance in this example is the number of elements of different values present at corresponding positions.

In the case where the index is the Hamming distance, an error correction code (Encode1, Decode1) for correcting the Hamming distance is used. An example of the error correction code is a BCH code. When the Hamming distance between Encode1(X) and Y is short, Decode1(Y)=X is established.

Hereinafter, a specific process in a case where an error correction code having additive linearity is used will be described. That is, Decode1(Encode1(X)+Encode1(Y))=X+Y is established for Encode1(X) and Encode1(Y). Note that each step number such as S201, which will be described later, corresponds to each step number shown in FIG. 2 or 5.

First, a process of registering a template on the basis of the biometric information X will be described. The key generation unit 110 generates a key pair (a public key $pk_E$ and a secret key $sk_E$) of a signature as follows (Step S101).

$(pk_E, sk_E) \leftarrow \text{KeyGen}(1^\kappa)$

The key generation unit 110 transmits the public key $pk_E$ generated in Step S101 to the server 201. The key reception unit 210 stores the received public key $pk_E$ in the key storage unit 220 (Step S102). In addition, the key generation unit 110 stores the generated public key $pk_E$ in the key storage unit 120 (Step S103).

Thereafter, the biometric information X of the person to be registered is input to the registered information input unit 130 (Step S104). Next, the random number generation unit 140 generates the random number R (Step S105). The random number generation unit 140 inputs the generated random number R to the concealment unit 150.

Next, the concealment unit 150 adds the secret key $sk_E$ stored in the key storage unit 120 and the input random number R. Next, the concealment unit 150 encodes ($sk_E$+R) using the linear error correction code as follows, and generates a template ss by masking (hiding) ($sk_E$+R) using the biometric information X (Step S106).

$$ss \leftarrow \text{Encode1}(sk_E+R)+X$$

Next, the random number generation unit 140 transmits the generated random number R to the server 201. After the transmission, the random number generation unit 140 deletes the random number R. In addition, the concealment unit 150 deletes the secret key sk (Step S107).

When receiving the transmitted random number R, the ID issuance unit 230 issues a user ID (Step S108). The ID issuance unit 230 transmits the issued user ID to the client 101.

The random number generation unit 140 receives the transmitted user ID. Next, the concealment unit 150 stores the received user ID in the concealed information storage unit 160 together with the template ss generated in Step S106 (Step S109).

In addition, the ID issuance unit 230 stores the issued user ID together with the received random number R in the random number storage unit 240 (Step S110).

Next, processing during authentication will be described. First, the biometric information Y of the person to be authenticated is input to the collation information input unit 170 (Step S211).

Next, the response computation unit 181 acquires the user ID and the template ss together from the concealed information storage unit 160 (Step S212). The response computation unit 181 transmits the acquired user ID to the server 201. The determination unit 260 of the server 201 receives the user ID from the client 101.

Next, the challenge generation unit 270 generates a challenge M (Step S213). The challenge generation unit 270 transmits the generated challenge M to the client 101.

Next, the response computation unit 181 computes the following value k on the basis of the biometric information Y input in Step S211 and the template ss acquired in Step S212.

$$k \leftarrow \text{Decode1}(ss-Y)$$

When X and Y are close, $k = sk_E + R$. Next, the response computation unit 181 generates an electronic signature with k as a secret key using the received challenge.

For example, in a case where the Schnorr signature is used, the response computation unit 181 randomly selects a random number r and computes $S = H(M, g^r)$. Note that H is a hash function. In addition, g is a prime number. Next, the response computation unit 181 computes the following value σ.

$$\sigma \leftarrow r - k \cdot S$$

After computing each value (Step S214), the response computation unit 181 transmits (M, S, σ) to the server 201 as a response including the Hamming distance between the biometric information X and the biometric information Y.

Note that (M, S, σ) corresponds to the Schnorr signature with k as the secret key. Note that the response computation unit 181 may use a digital signature algorithm (DSA) signature used in a standard manner, instead of the Schnorr signature. In addition, the response computation unit 181 may use another digital signature method whose safety has been mathematically proven.

The determination unit 260 of the server 201 receives the response transmitted from the client 101. The determination unit 260 verifies the electronic signature (M, S, σ) using the public key $pk_E$ stored in the key storage unit 220 and the random number R stored in the random number storage unit 240 together with the received user ID (Step S215 and Step S216).

For example, in the case where the Schnorr signature is used, the determination unit 260 confirms whether or not the following formulas are established.

$$vk_k = pk_E \cdot g^R = g^{skE+R}$$

$$H(g^\sigma \sigma(vk_k)^S) = S$$

If any one of the above formulas is not established, it is determined that the received response does not correspond to the transmitted challenge or the index included in the response is not the value within the acceptance range, and the determination unit 260 generates authentication result information indicating "authentication failure" (Step S217).

When both of the above formulas are established, the determination unit 260 determines that the received response corresponds to the transmitted challenge and the index included in the response is the value within the acceptance range, and generates authentication result information indicating "authentication success" (Step S217).

Next, the determination unit 260 transmits the generated authentication result information to the client 101. Next, the output unit 190 receives the transmitted authentication result information. The output unit 190 outputs the received authentication result information (Step S218). Note that the authentication result information may be directly output from the server 201.

Specific Example 2

In the present specific example, a case is considered in which an index indicating closeness between the biometric information X and the biometric information Y is an inner product of the biometric information X and the biometric information Y The inner product <X, Y> of the biometric information X and the biometric information Y is $\Sigma(x_i \cdot y_i)$. Hereinafter, the case where the index is the inner product will be described as an example. Hereinafter, an example of processing in the case where the index is the inner product will be described.

In addition, the Schnorr signature is used in this specific example. In the Schnorr signature, a pair of the secret key sk and the public key $pk = g^{sk}$ is generated. Note that $sk \in Z_q$ ($Z_q = \{0, 1, \ldots, q-1\}$, q is a prime number) (Z is a symbol representing a set of all integers). In addition, g is a generator of a group G of the order q. That is, $G = \{g^0, g^1, \ldots, g^{q-1}\}$. Here, $Z_q$ g, and G are shared between the client 101 and the server 201.

Hereinafter, a specific registration process in the case where the Schnorr signature is used will be described with reference to FIG. 6. FIG. 6 is an explanatory diagram showing an example of the specific registration process in the collation system 11. Note that the registration process shown in FIG. 6 is not performed according to the processing progress shown in FIG. 2.

First, the biometric information X of a person to be registered is input to the registered information input unit 130. Next, the random number generation unit 140 generates a random number as follows.

$$(r_1, r_2, \ldots, r_n) \leftarrow^R Z_q$$

$$R_1, R_2 \leftarrow^R Z_q$$

Note that the notation "R" represents that each of $\{r_i\}$, $R_1$, and $R_2$ to be generated is a random number. The random number generation unit 140 inputs the generated random number to the concealment unit 150.

Next, the concealment unit 150 generates $R_1 x_i + R_2 r_i$ and $g^{r_i}$ for i=1, 2, ..., and n on the basis of the input random number and the biometric information X. Hereinafter, a template is assumed as $\{R_1 x_i + R_2 r_i\}$ and $\{g^{r_i}\}$.

Next, the concealment unit 150 transmits $g^R_1$ corresponding to the public key to the server 201 via the key generation unit 110. After the transmission, the concealment unit 150 deletes the public key $g^R_1$.

The key reception unit 210 of the server 201 receives the public key $g^R_1$ from the client 101. The key reception unit 210 stores the public key $g^R_1$ in the key storage unit 220.

In addition, the random number generation unit 140 transmits the generated random number $R_2$ to the server 201. After the transmission, the concealment unit 150 deletes the random number $R_2$.

The ID issuance unit 230 that has received the transmitted random number $R_2$ issues a user ID. The ID issuance unit 230 transmits the issued user ID to the client 101.

The random number generation unit 140 receives the transmitted user ID. Next, the concealment unit 150 stores the received user ID in the concealed information storage unit 160 together with the generated template.

In addition, the ID issuance unit 230 stores the issued user ID in the random number storage unit 240 together with the received random number $R_2$.

Next, a specific authentication process in the case where the Schnorr signature is used will be described with reference to FIG. 7. FIG. 7 is an explanatory diagram showing an example of the specific authentication process in the collation system 11.

First, the biometric information Y of the person to be authenticated is input to the collation information input unit 170 (Step S211).

Next, the response computation unit 181 acquires a user ID and a template together from the concealed information storage unit 160 (Step S212). The response computation unit 181 transmits the acquired user ID to the server 201. The determination unit 260 of the server 201 receives the user ID from the client 101.

Next, the challenge generation unit 270 generates a challenge M (Step S213). The challenge generation unit 270 transmits the generated challenge M to the client 101.

Next, the response computation unit 181 generates $r \leftarrow^R Z_q$. Next, the response computation unit 181 computes $S = H(M, g^r)$. Note that H is a cryptographic hash function. Next, the response computation unit 181 computes the following values on the basis of the input biometric information Y and the template.

$$A = \Sigma(R_1 x_i + R_2 r_i) \cdot y_i$$

$$\sigma_1 = r - A \cdot S$$

$$\sigma_2 = g^{\Sigma r_i y_i}$$

Note that A is a value obtained by adding $\Sigma r_i y_i$ multiplied by $R_2$ to a value obtained by multiplying the inner product $<X, Y>$ of X and Y by $R_1$. After computing each value (Step S214), the response computation unit 181 transmits (S, $\sigma_1$, $\sigma_2$) to the server 201 as a response including the inner product of the biometric information X and the biometric information Y. This (S, $\sigma_1$, $\sigma_2$) corresponds to the Schnorr signature with A as a secret key.

The determination unit 260 of the server 201 receives the response transmitted from the client 101. The determination unit 260 verifies the electronic signature (S, $\sigma_1$, $\sigma_2$) using the public key $g^R_1$ stored in the key storage unit 220 and the random number $R_2$ stored in the random number storage unit 240 together with the received user ID (Step S215 and Step S216). Specifically, the determination unit 260 computes the following formulas.

$$\{v_j = g^{\sigma_1}(\sigma_2)^{S \cdot R2}(g^{R1})^{a_j \cdot S}\}$$

$$\{H(M, v_j) = S'_j\}$$

Note that a symbol j represents 1, ..., and d. Here, $\{a_j\} = (a_1, a_2, \ldots, a_d)$ is an acceptance range stored in the acceptance range storage unit 250. That is, the determination unit 260 computes the above formulas for each $\{a_j\}$.

If there is no $S'_j$ satisfying $S = S'_j$, it is determined that the received response does not correspond to the transmitted challenge or the index included in the response is not the value within the acceptance range, and the determination unit 260 generates authentication result information indicating "authentication failure (NG shown in FIG. 7)" (Step S217).

In addition, if there is $S'_j$ satisfying $S = S'_j$, it is determined that the received response corresponds to the transmitted challenge and the index included in the response is the value within the acceptance range, and the determination unit 260 generates authentication result information indicating "authentication success (OK shown in FIG. 7)" (Step S217).

Next, the determination unit 260 transmits the generated authentication result information to the client 101. Next, the output unit 190 receives the transmitted authentication result information. The output unit 190 outputs the received authentication result information (Step S218). Note that the authentication result information may be directly output from the server 201.

Note that the Schnorr signature is used in this specific example, but another digital signature method which is cryptographically safe, such as the DSA signature, may be used.

Specific Example 3

In the present specific example, a case is also considered in which an index indicating closeness between the biometric information X and the biometric information Y is an inner product of the biometric information X and the biometric information Y. The inner product $<X, Y>$ of the biometric information X and the biometric information Y is $\Sigma(x_i \cdot y_i)$. Hereinafter, the case where the index is the inner product will be described as an example. Hereinafter, an example of processing in the case where the index is the inner product will be described.

In addition, the Schnorr signature is used in this specific example. In the Schnorr signature, a pair of the secret key sk and the public key $pk = g^{sk}$ is generated. Note that $sk \in Z_q$ ($Z_q = \{0, 1, \ldots, q-1\}$, q is a prime number) (Z is a symbol representing a set of all integers). In addition, g is a generator of a group G of the order q. That is, $G = \{g^0, g^1, \ldots, g^{q-1}\}$ Here, $Z_q$, g, and G are shared between the client 101 and the server 201.

Further, the acceptance range $\Theta = \{\theta_1, \ldots, \theta_N\}$ is given to the server 201. The acceptance range storage unit 250 of the server 201 stores $\Theta'=\{g^{\Theta 1}, \ldots, g^{\Theta N}\}$. It should be noted that $\Theta'$ is a set of powers of g with each value of $\Theta$ as an index.

Hereinafter, a specific registration process in the case where the Schnorr signature is used will be described with reference to FIG. 8. FIG. 8 is an explanatory diagram showing another example of the specific registration process in the collation system 11. Note that the registration process shown in FIG. 8 is not performed according to the processing progress shown in FIG. 2.

First, the biometric information X of a person to be registered is input to the registered information input unit 130. Next, the random number generation unit 140 generates a random number as follows.

$$(r_1, r_2, \ldots, r_n) \leftarrow^R Z_q$$

$$R_1, R_2, R_3 \leftarrow^R Z_q$$

Note that the notation "R" represents that each of $\{r_i\}$, $R_1$, $R_2$, and $R_3$ to be generated is a random number. The random number generation unit 140 inputs the generated random number to the concealment unit 150.

Next, the concealment unit 150 generates $R_1 x_i + R_2 r_i + R_3$ and $g^{r_i}$ for $i=1, 2, \ldots,$ and n on the basis of the input random number and the biometric information X. Hereinafter, a template is assumed as $\{R_1 x_i + R_2 r_i + R_3\}$ and $\{g^{r_i}\}$.

Next, the concealment unit 150 transmits $g^{R3}$ corresponding to the public key to the server 201 via the key generation unit 110. After the transmission, the concealment unit 150 deletes the public key $g^{R3}$.

The key reception unit 210 of the server 201 receives the public key $g^{R3}$ from the client 101. The key reception unit 210 stores the public key $g^{R3}$ in the key storage unit 220.

In addition, the random number generation unit 140 transmits the generated random number $R_1$ and $R_2$ to the server 201. After the transmission, the concealment unit 150 deletes the random number $R_1$ and $R_2$.

The ID issuance unit 230 that has received the transmitted random number $R_1$ and $R_2$ issues a user ID. The ID issuance unit 230 transmits the issued user ID to the client 101.

The random number generation unit 140 receives the transmitted user ID. Next, the concealment unit 150 stores the received user ID in the concealed information storage unit 160 together with the generated template.

In addition, the ID issuance unit 230 stores the issued user ID in the random number storage unit 240 together with the received random number $R_1$ and $R_2$.

Next, the specific authentication process in the case where the Schnorr signature is used will be described with reference to FIG. 9. FIG. 9 is an explanatory diagram showing another example of the specific authentication process in the collation system 11.

First, the biometric information Y of the person to be authenticated is input to the collation information input unit 170 (Step S211).

Next, the response computation unit 181 acquires a user ID and a template together from the concealed information storage unit 160 (Step S212).

Next, the response computation unit 181 generates $r \leftarrow^R Z_q$ and computes $g^r$. The response computation unit 181 also computes $\sigma = g^{\Sigma r_i y_i}$.

Next, the response computation unit 181 transmits the acquired user ID and the computed $g^r$ and $\sigma$ to the server 201. The determination unit 260 of the server 201 receives the transmitted user ID, $g^r$, and $\sigma$ from the client 101.

Next, the challenge generation unit 270 generates $R' \leftarrow^R Z_q$. Next, the challenge generation unit 270 generates the challenge M, $g^{R3 \cdot R'}$ (Step S213). The challenge generation unit 270 transmits the generated challenge M, $g^{R3 \cdot R'}$ to the client 101.

Next, the response computation unit 181 computes S=H (M, $g^r$). Note that H is a cryptographic hash function. Next, the response computation unit 181 computes the following values on the basis of the input biometric information Y and the template.

$$A = \Sigma(R_1 x_i + R_2 r_i) \cdot y_i$$

$$\sigma_1 = r - A \cdot S$$

$$\sigma_2 = g^{\Sigma R3 \cdot R' \cdot y_i}$$

Note that A is a value obtained by adding $\Sigma r_i y_i$ multiplied by $R_2$ and $\Sigma y_i$ multiplied by $R_3$ to a value obtained by multiplying the inner product $<X, Y>$ of X and Y by $R_1$. After computing each value (Step S214), the response computation unit 181 transmits (S, $\sigma_1$, $\sigma_2$) to the server 201 as a response including the inner product of the biometric information X and the biometric information Y. This (S, $\sigma_1$, $\sigma_2$) corresponds to the Schnorr signature with A as a secret key.

The determination unit 260 of the server 201 receives the response transmitted from the client 101. The determination unit 260 verifies the electronic signature (S, $\sigma_1$, $\sigma_2$) using the public key $g^{R3}$ stored in the key storage unit 220 and the random number $R_1$ and $R_2$ stored in the random number storage unit 240 together with the received user ID (Step S215 and Step S216). Specifically, the determination unit 260 computes the following formula.

$$v = \{g^{\sigma_1}(\sigma_2)^{S \cdot R3}(g^{\Sigma r_i y_i})^{S \cdot R2}(g^{-r})\}^{(-1/R1)}$$

The determination unit 260 checks whether the computed v is included in $\Theta'$. When v is not included in $\Theta'$, it is determined that the received response does not correspond to the transmitted challenge or the index included in the response is not the value within the acceptance range, and the determination unit 260 generates authentication result information indicating "authentication failure (NG shown in FIG. 9)" (Step S217).

In addition, when v is included in $\Theta'$, it is determined that the received response corresponds to the transmitted challenge and the index included in the response is the value within the acceptance range, and the determination unit 260 generates authentication result information indicating "authentication success (OK shown in FIG. 9)" (Step S217).

Next, the determination unit 260 transmits the generated authentication result information to the client 101. Next, the output unit 190 receives the transmitted authentication result information. The output unit 190 outputs the received authentication result information (Step S218). Note that the authentication result information may be directly output from the server 201.

Note that the Schnorr signature is used in this specific example, but another digital signature method which is cryptographically safe, such as the DSA signature, may be used.

The computation of the distance in the determination process in this specific example is simpler than the computation in specific example 2. Therefore, the determination unit 260 can execute the determination process at a higher speed.

In addition, the server 201 receives the public key $g^{R3}$ from the client 101. The server 201 transmits $g^{R3 \cdot R'}$ to the client 101 as a part of the challenge. That is, the server 201 does not manage $R_3$ itself. Therefore, even if other random numbers or public keys are leaked from the server 201, $R_3$ is not leaked, and thus spoofing is prevented.

DESCRIPTION OF EFFECT

Since the collation system 11 of the present exemplary embodiment performs authentication using the challenge response method, a value of the response is changed for each authentication. That is, even if an attacker intercepts the value of the response, a re-transmission attack is prevented since the intercepted value is no longer usable in the next authentication.

In addition, the acceptance range stored in the acceptance range storage unit 250 may be changed for each user and for each client in the exemplary embodiments of the present invention and the specific examples thereof. In addition, the acceptance range may be changed according to an external factor or the like. Examples of the external factor include a frequency of authentication accepted by the server, a frequency of suspicious access, and a state of a load on a communication network or a CPU. When the acceptance range is changed, the load on the communication network or the CPU is likely to be reduced.

Note that a collation system that executes only the registration process among the processes executed by the collation system 10 and the collation system 11 may be configured. For example, the collation system may be constituted by a client including the key generation unit 110, the key storage unit 120, the registered information input unit 130, the random number generation unit 140, the concealment unit 150, and the concealed information storage unit 160, and a server including the key reception unit 210, the key storage unit 220, the ID issuance unit 230, and the random number storage unit 240.

Similarly, a collation system that executes only the authentication process among the processes executed by the collation system 10 and the collation system 11 may be configured. For example, the collation system may be constituted by a client including the concealed information storage unit 160, the collation information input unit 170, the concealed index computation unit 180, and the output unit 190, and a server including the key storage unit 220, the random number storage unit 240, the acceptance range storage unit 250, and the determination unit 260.

Figure 10:
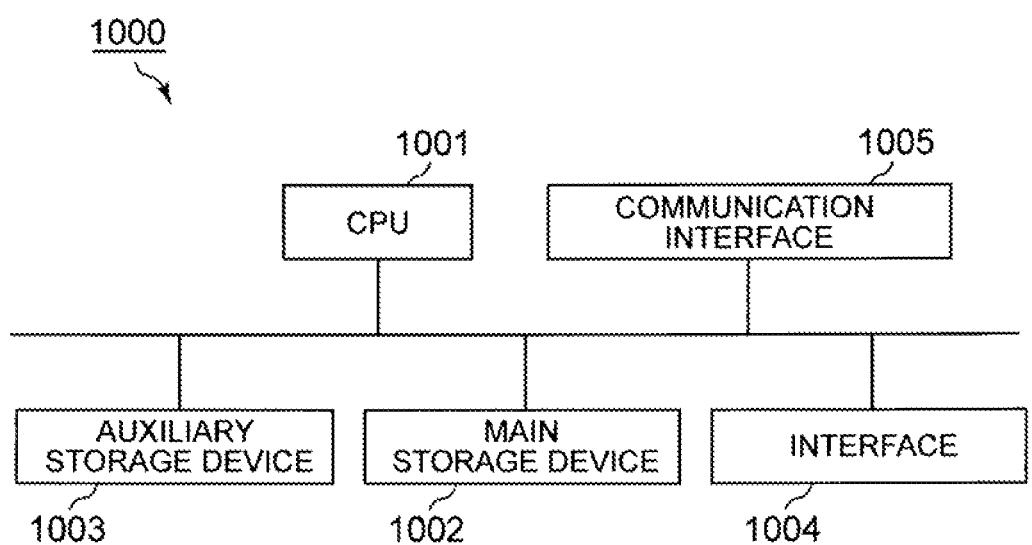
FIG. 10 is a schematic block diagram showing a configuration example of a computer related to a client or a server according to an exemplary embodiment of the present invention or a specific example thereof.

FIG. 10 is a schematic block diagram showing a configuration example of a computer related to a client and a server in the above exemplary embodiments and specific examples thereof. A computer used as the client and a computer used as the server are separate computers although described later with reference to FIG. 10.

A computer 1000 includes a CPU 1001, a main storage device 1002, an auxiliary storage device 1003, an interface 1004, and a communication interface 1005.

The client and the server in the exemplary embodiments of the present invention and the specific examples thereof are realized by the computer 1000. Meanwhile, the computer used as the client and the computer used as the server are separate computers as described above.

An operation of the computer 1000 that realizes the client is stored in the auxiliary storage device 1003 in the form of a client program. The CPU 1001 reads the client program from the auxiliary storage device 1003, expands the client program in the main storage device 1002, and executes the operations of the client described in the above exemplary embodiments and specific examples thereof according to the client program.

An operation of the computer 1000 that realizes the server is stored in the auxiliary storage device 1003 in the form of a server program. The CPU 1001 reads the server program from the auxiliary storage device 1003, expands the server program in the main storage device 1002, and executes the operations of the server described in the above exemplary embodiments and specific examples thereof according to the server program.

The auxiliary storage device 1003 is an example of a non-transitory tangible medium. Other examples of the non-transitory tangible medium include a magnetic disk, a magneto-optical disk, a compact disk read-only memory (CD-ROM), a digital versatile disk read-only memory (DVD-ROM), a semiconductor memory, and the like connected via the interface 1004. In addition, when the program is distributed to the computer 1000 via a communication line, the computer 1000 may expand the program into the main storage device 1002 and operate according to the expanded program.

In addition, some or all of constituent elements of the client may be implemented using a general-purpose or dedicated circuit (circuitry), a processor, or a combination thereof. These may be configured by a single chip, or may be configured by a plurality of chips connected via a bus. Some or all of constituent elements may be implemented using a combination of the above-described circuits and the like and a program. The same applies to the server.

Figure 11:
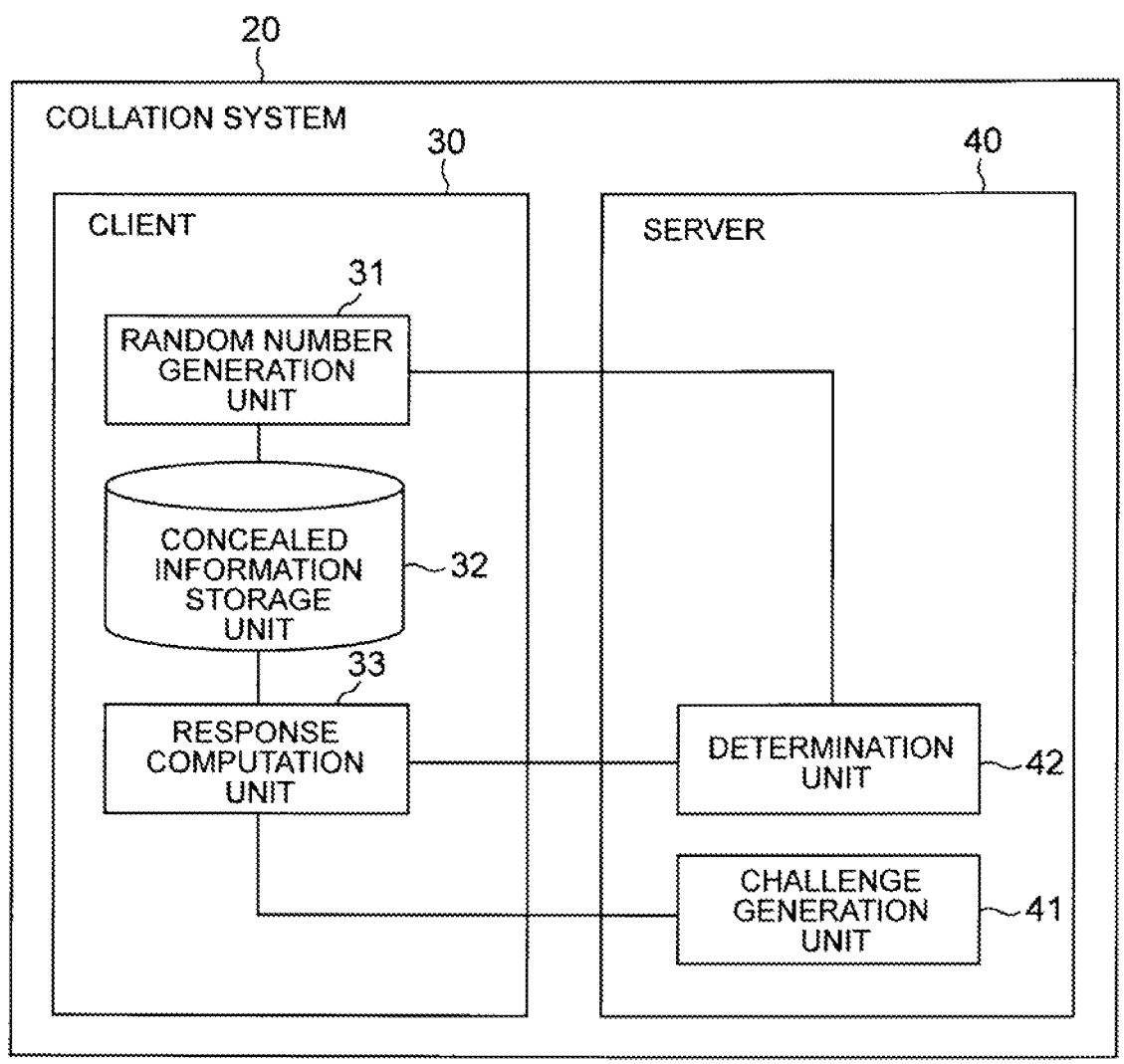
FIG. 11 is a block diagram showing an outline of a collation system according to the present invention.

Next, an outline of the present invention will be described. FIG. 11 is a block diagram showing an outline of a collation system according to the present invention. A collation system 20 according to the present invention is a collation system which employs a challenge response method including a client 30 (for example, the client 101) and a server 40 (for example, the server 201). The client 30 includes: a random number generation unit 31 (for example, the random number generation unit 140) which generates a random number; a concealed information storage unit 32 (for example, the concealed information storage unit 160) which stores concealed information generated by concealing registered information and the generated random number using a secret key; and a response computation unit 33 (for example, the response computation unit 181) which, on the basis of a challenge transmitted from the server 40, the collation information input for collation with the registered information, and the concealed information, computes a response corresponding to the challenge and including a concealed index, generated by concealing an index indicating closeness between the registered information and the collation information. The server 40 includes: a challenge generation unit 41 (for example, the challenge generation unit 270) which generates the challenge using a public key corresponding to the secret key; and a determination unit 42 (for example, the determination unit 260) which uses the public key and the random number transmitted from the client 30 to determine whether or not the response transmitted from the client 30 corresponds to the challenge.

With such a configuration, the collation system can prevent the leakage of the secret information of the user from the client even when the concealed information generated by concealing the registered information is stored in the client.

In addition, the determination unit 42 may determine whether or not the collation information and the registered information correspond to each other on the basis of the index acquired from the response corresponding to the challenge.

With such a configuration, the collation system can determine whether or not the person to be registered and the person to be authenticated match.

In addition, the client 30 may further include a concealment unit (for example, the concealment unit 150) which generates concealed information by concealing input registered information using the secret key and stores the concealed information in the concealed information storage unit 32.

In addition, the client 30 may further include a key generation unit (for example, the key generation unit 110) which generates the secret key and the public key, and the key generation unit may transmit the public key to the server 40. In addition, the response computation unit 33 may generate an electronic signature using the secret key, and transmit the response including the generated electronic signature to the server 40.

With such a configuration, the collation system can authenticate a sender of the response.

In addition, the registered information and the collation information may be vectors. In addition, the response computation unit 33 may compute a concealed index generated by concealing an index defined on the basis of a Hamming distance between the registered information and the collation information. In addition, the response computation unit 33 may compute a concealed index generated by concealing an index defined on the basis of an inner product of the registered information and the collation information.

The exemplary embodiments of the present invention described above may also be described as in the following supplementary notes, but are not limited to the following.

(Supplementary Note 1)

A collation system which employs a challenge response method including:
 a client; and
 a server,
 in which the client includes:
 a random number generation unit which generates a random number;
 a concealed information storage unit which stores concealed information generated by concealing registered information and the generated random number using a secret key; and
 a response computation unit which, on the basis of a challenge transmitted from the server, the collation information input for collation with the registered information, and the concealed information, computes a response corresponding to the challenge and including a concealed index, generated by concealing an index indicating closeness between the registered information and the collation information, and
 the server includes:
 a challenge generation unit which generates the challenge using a public key corresponding to the secret key; and
 a determination unit which uses the public key and the random number transmitted from the client to determine whether or not the response transmitted from the client corresponds to the challenge.

(Supplementary Note 2)

The collation system according to Supplementary Note 1, in which
 the determination unit determines whether or not the collation information and the registered information correspond to each other on the basis of the index acquired from the response corresponding to the challenge.

(Supplementary Note 3)

The collation system according to Supplementary Note 1 or 2, in which
 the client further includes a concealment unit which generates concealed information by concealing input registered information using the secret key and stores the concealed information in the concealed information storage unit.

(Supplementary Note 4)

The collation system according to any one of Supplementary Notes 1 to 3, in which
 the client further includes a key generation unit which generates the secret key and the public key, and
 the key generation unit transmits the public key to the server.

(Supplementary Note 5)

The collation system according to any one of Supplementary Notes 1 to 4, in which
 the response computation unit generates an electronic signature using the secret key, and transmits the response including the generated electronic signature to the server.

(Supplementary Note 6)

The collation system according to any one of Supplementary Notes 1 to 5, in which
 the registered information and the collation information are vectors.

(Supplementary Note 7)

The collation system according to Supplementary Note 6, in which
 the response computation unit computes a concealed index generated by concealing an index defined on the basis of a Hamming distance between the registered information and the collation information.

(Supplementary Note 8)

The collation system according to Supplementary Note 6, in which
 the response computation unit computes a concealed index generated by concealing an index defined on the basis of an inner product of the registered information and the collation information.

(Supplementary Note 9)

A collation system which employs a challenge response method including:
 a client; and
 a server,
 in which the client includes:
 a random number generation unit which generates a random number; and
 a concealed information storage unit which stores concealed information generated by concealing registered information and the generated random number using a secret key.

(Supplementary Note 10)

A collation system which employs a challenge response method including:
 a client; and
 a server,
 in which the client includes a response computation unit which, on the basis of a challenge transmitted from the server, the collation information input for collation with the registered information, and concealed information generated by concealing the registered information and a random number using a secret key, computes a response corresponding to the challenge and including a concealed index, generated by concealing an index indicating closeness between the registered information and the collation information, and the server includes:
  a challenge generation unit which generates the challenge using a public key corresponding to the secret key; and
  a determination unit which uses the public key and the random number transmitted from the client to determine whether or not the response transmitted from the client corresponds to the challenge.

(Supplementary Note 11)
A client including:
  a random number generation unit which generates a random number;
  a concealed information storage unit which stores concealed information generated by concealing registered information and the generated random number using a secret key; and
  a response computation unit which, on the basis of a challenge generated by using a public key corresponding to the secret key, the collation information input for collation with the registered information, and the concealed information, computes a response corresponding to the challenge and including a concealed index, generated by concealing an index indicating closeness between the registered information and the collation information.

(Supplementary Note 12)
The client according to Supplementary Note 11, further including
  a concealment unit which generates concealed information by concealing input registered information using the secret key and stores the concealed information in a concealed information storage unit.

(Supplementary Note 13)
The client according to Supplementary Note 11 or 12, further including
  a key generation unit which generates the secret key and the public key,
  in which the key generation unit transmits the public key to a server.

(Supplementary Note 14)
The client according to any one of Supplementary Notes 11 to 13, in which
  the response computation unit generates an electronic signature using the secret key, and transmits the response including the generated electronic signature to the server.

(Supplementary Note 15)
A server including:
  a challenge generation unit which generates a challenge using a public key corresponding to a secret key; and
  a determination unit which determines whether or not a response corresponds to a generated challenge, using the public key and a random number transmitted from a client, the response including a concealed index, generated by concealing the index indicating closeness between registered information and collation information and computed on the basis of the challenge, the collation information input for collation with the registered information, and the concealed information generated by concealing the registered information and the random number using the secret key.

(Supplementary Note 16)
The server according to Supplementary Note 15, in which
  the determination unit determines whether or not the collation information and the registered information correspond to each other on the basis of the index acquired from the response corresponding to the challenge.

(Supplementary Note 17)
A collation method in a collation system which includes a client and a server and employs a challenge response method, the collation method including:
  causing the client
    to generate a random number,
    to transmit the generated random number to the server,
    to store concealed information generated by concealing registered information and the generated random number using a secret key in a concealed information storage unit,
    to compute, on the basis of a challenge generated by using a public key corresponding to the secret key and transmitted from the server, the collation information input for collation with the registered information and the concealed information, a response corresponding to the challenge and including a concealed index, generated by concealing an index indicating closeness between the registered information and the collation information, and
    to transmit the computed response to the server; and
  causing the server to use the public key and the transmitted random number to determine whether or not the transmitted response corresponds to the challenge.

(Supplementary Note 18)
A collation method in a client, the collation method including:
  generating a random number;
  storing concealed information, generated by concealing registered information and the generated random number using a secret key, in a concealed information storage unit; and
  computing, on the basis of a challenge generated by using a public key corresponding to the secret key, the collation information input for collation with the registered information, and the concealed information, a response corresponding to the challenge and including a concealed index, generated by concealing an index indicating closeness between the registered information and the collation information.

(Supplementary Note 19)
A collation method in a server, the collation method including:
  generating a challenge using a public key corresponding to a secret key; and
  determining whether or not a response corresponds to a generated challenge, using the public key and a random number transmitted from a client, the response including a concealed index, generated by concealing the index indicating closeness between registered information and collation information and computed on the basis of the challenge, the collation information input for collation with the registered information, and the concealed information generated by concealing the registered information and the random number using the secret key.

(Supplementary Note 20)
A client program installed in a computer, which includes a concealed information storage unit which stores concealed information generated by concealing registered information and a random number using a secret key and operates as a client,
  the client program causing the computer to execute
    a computation process of computing, on the basis of a challenge generated by using a public key corresponding to the secret key, the collation information input for collation with the registered information, and the concealed information, a response corresponding to the challenge and including a concealed index, generated by concealing an index indicating closeness between the registered information and the collation information.

(Supplementary Note 21)

A server program installed in a computer which operates as a server, the server program causing the computer to execute:
a generating process of generating a challenge using a public key corresponding to a secret key, and
a determination process of determining whether or not a response corresponds to a generated challenge, using the public key and a random number transmitted from a client, the response including a concealed index, generated by concealing the index indicating closeness between registered information and collation information and computed on the basis of the challenge, the collation information input for collation with the registered information, and the concealed information generated by concealing the registered information and the random number using the secret key.

The invention of the present application has been described above with reference to the exemplary embodiments, but the invention of the present application is not limited to the above-described exemplary embodiments. Various modifications that can be understood by the person skilled in the art can be made within a scope of the invention of the present application regarding the configuration and the details of the invention of the present application.

INDUSTRIAL APPLICABILITY

The present invention is suitably applied to a collation system that performs authentication using a client and a server.

REFERENCE SIGNS LIST 10, 11, 20 Collation system
30, 100, 101 Client
40, 200, 201 Server
31, 140 Random number generation unit
32, 160 Concealed information storage unit
33, 181 Response computation unit
41, 270 Challenge generation unit
42, 260 Determination unit
110 Key generation unit
120, 220 Key storage unit
130 Registered information input unit
150 Concealment unit
170 Collation information input unit
180 Concealed index computation unit
190 Output unit
210 Key reception unit
230 ID issuance unit
240 Random number storage unit
250 Acceptance range storage unit

What is claimed is:

1. A collation system which employs a challenge response method, comprising:
a client; and
a server,
wherein the client includes:
a first memory configured storing first instructions;
a first processor configured to execute the first instructions to generate a random number; and
a concealed information storage device which stores concealed information generated by concealing registered information and the generated random number using a secret key,
wherein the first processor is configured to execute the first instructions to further, on the basis of a challenge transmitted from the server, the collation information input for collation with the registered information, and the concealed information, compute a response corresponding to the challenge and including a concealed index, generated by concealing an index indicating closeness between the registered information and the collation information, and
wherein the server includes:
a second memory storing second instructions; and
a second processor configured to execute the second instructions to:
generate the challenge using a public key corresponding to the secret key; and
use the public key and the random number transmitted from the client to determine whether or not the response transmitted from the client corresponds to the challenge.

2. The collation system according to claim 1, wherein the second processor determines whether or not the collation information and the registered information correspond to each other on the basis of the index acquired from the response corresponding to the challenge.

3. The collation system according to claim 2, wherein the first processor generates the concealed information by concealing input registered information using the secret key and stores the concealed information in the concealed information storage unit device.

4. The collation system according to claim 3, wherein the first processor generates the secret key and the public key, and
the first processor transmits the public key to the server.

5. The collation system according to claim 2, wherein the first processor generates the secret key and the public key, and
the first processor transmits the public key to the server.

6. The collation system according to claim 1, wherein the first processor generates the concealed information by concealing input registered information using the secret key and stores the concealed information in the concealed information storage device.

7. The collation system according to claim 6, wherein the first processor generates the secret key and the public key, and
the first processor transmits the public key to the server.

8. The collation system according to claim 1, wherein the first processor generates the secret key and the public key, and
the first processor transmits the public key to the server.

9. The collation system according to claim 1, wherein the first processor generates an electronic signature using the secret key, and transmits the response including the generated electronic signature to the server.

10. The collation system according to claim 1, wherein the registered information and the collation information are vectors.

11. The collation system according to claim 10, wherein the first processor computes the concealed index generated by concealing the index indicating the closeness and defined on the basis of a Hamming distance between the registered information and the collation information.

12. The collation system according to claim 10, wherein
the first processor computes the concealed index generated by concealing the index indicating the closeness and defined on the basis of an inner product of the registered information and the collation information.

13. A collation system which employs a challenge response method, comprising:
a client; and
a server,
wherein the client includes:
a first memory configured storing first instructions; and
a first processor configured to execute the first instructions to:
on the basis of a challenge transmitted from the server, collation information input for collation with registered information, and concealed information generated by concealing the registered information and a random number using a secret key, compute a response corresponding to the challenge and including a concealed index, generated by concealing an index indicating closeness between the registered information and the collation information, and
wherein the server includes:
a second memory configured storing second instructions; and
a second processor configured to execute the second instructions:
generate the challenge using a public key corresponding to the secret key; and
use the public key and the random number transmitted from the client to determine whether or not the response transmitted from the client corresponds to the challenge.

14. A client comprising:
a memory storing instructions;
a processor configured to execute the instructions to generate a random number; and
a concealed information storage device which stores concealed information generated by concealing registered information and the generated random number using a secret key,
wherein the processor is configured to execute the instructions to further, on the basis of a challenge generated by using a public key corresponding to the secret key, the collation information input for collation with the registered information, and the concealed information, compute a response corresponding to the challenge and including a concealed index, generated by concealing an index indicating closeness between the registered information and the collation information.

15. The client according to claim 14, wherein
the processor generates the concealed information by concealing input registered information using the secret key and stores the concealed information in the concealed information storage device.

16. The client according to claim 14, wherein
wherein the processor generates the secret key and the public key, and
wherein the processor transmits the public key to a server.

17. The client according to claim 14, wherein
the processor generates an electronic signature using the secret key, and transmits the response including the generated electronic signature to the server.

18. A server comprising:
a memory storing instructions; and
a processor configured to execute the instructions to:
generate a challenge using a public key corresponding to a secret key; and
determine whether or not a response corresponds to a generated challenge, using the public key and a random number transmitted from a client, the response including a concealed index, generated by concealing the index indicating closeness between registered information and collation information and computed on the basis of the challenge, the collation information input for collation with the registered information, and the concealed information generated by concealing the registered information and the random number using the secret key.

19. The server according to claim 18, wherein
the processor determines whether or not the collation information and the registered information correspond to each other on the basis of the index acquired from the response corresponding to the challenge.

* * * * *